US011858037B2

(12) United States Patent
Fontana et al.

(10) Patent No.: US 11,858,037 B2
(45) **Date of Patent: *Jan. 2, 2024**

(54) SMART MOLTEN METAL PUMP

(71) Applicant: Molten Metal Equipment Innovations, LLC, Middlefield, OH (US)

(72) Inventors: Vince Fontana, Middlefield, OH (US); James Robert Daniels, Middlefield, OH (US)

(73) Assignee: Molten Metal Equipment Innovations, LLC, Middlefield, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 17/939,898

(22) Filed: Sep. 7, 2022

(65) Prior Publication Data

US 2023/0001474 A1 Jan. 5, 2023

Related U.S. Application Data

(63) Continuation of application No. 16/877,332, filed on May 18, 2020, now Pat. No. 11,471,938.

(Continued)

(51) Int. Cl.

*B22D 41/00* (2006.01)
*B22D 35/04* (2006.01)

(Continued)

(52) U.S. Cl.

CPC ............. *B22D 41/00* (2013.01); *B22D 35/04* (2013.01); *B22D 39/02* (2013.01); *F04D 7/065* (2013.01);

(Continued)

(58) Field of Classification Search

CPC ........ B22D 39/02; F27D 27/005; F04D 7/065
See application file for complete search history.

(56) References Cited

U.S. PATENT DOCUMENTS 35,604 A 6/1862 Guild
116,797 A 7/1871 Barnhart (Continued)

FOREIGN PATENT DOCUMENTS

CA 683469 3/1964
CA 2115929 8/1992

(Continued)

OTHER PUBLICATIONS

"Response to Final Office Action and Request for Continued Examination for U.S. Appl. No. 09/275,627," including Declarations of Haynes and Johnson, Apr. 16, 2001.

(Continued)

*Primary Examiner* — Scott R Kastler
(74) *Attorney, Agent, or Firm* — SNELL & WILMER L.L.P.

(57) ABSTRACT

A smart molten metal pump system and method automatically controls the operating speed of the pump rather than requiring an operator to control the speed. The system includes a pump, a controller for controlling the speed of the pump and one or more vibration sensors (such as an accelerometer) to measure vibration. The controller receives input about the vibration of the pump or one or more pump components, and possibly other data, such as the temperature of the molten metal, and/or the depth of the molten metal, ad/or parameters related to the operation of the pump. The controller analyzes the one or more inputs to vary the speed of the pump, turn the pump off, and/or send a communication to an operator.

23 Claims, 9 Drawing Sheets

Related U.S. Application Data

(60) Provisional application No. 62/852,846, filed on May 24, 2019, provisional application No. 62/849,787, filed on May 17, 2019.

(51) Int. Cl.

| | |
|---|---|
| ***F04D 7/06*** | (2006.01) |
| ***F27D 3/14*** | (2006.01) |
| ***F27D 27/00*** | (2010.01) |
| ***F27B 3/04*** | (2006.01) |
| ***B22D 39/02*** | (2006.01) |
| ***F04D 29/02*** | (2006.01) |
| ***B22D 39/00*** | (2006.01) |
| ***F27D 3/00*** | (2006.01) |
| ***F04D 29/42*** | (2006.01) |

(52) U.S. Cl.

CPC ............ *F04D 29/026* (2013.01); *F27B 3/045* (2013.01); *F27D 3/14* (2013.01); *F27D 27/005* (2013.01); *B22D 39/00* (2013.01); *F04D 29/426* (2013.01); *F27D 2003/0054* (2013.01); *F27M 2001/012* (2013.01)

(56) References Cited

U.S. PATENT DOCUMENTS

| | | | |
|---|---|---|---|
| 209,219 | A | 10/1878 | Bookwalter |
| 251,104 | A | 12/1881 | Finch |
| 307,845 | A | 11/1884 | Curtis |
| 364,804 | A | 6/1887 | Cole |
| 390,319 | A | 10/1888 | Thomson |
| 495,760 | A | 4/1893 | Seitz |
| 506,572 | A | 10/1893 | Wagener |
| 585,188 | A | 6/1897 | Davis |
| 757,932 | A | 4/1904 | Jones |
| 882,477 | A | 3/1908 | Neumann |
| 882,478 | A | 3/1908 | Neumann |
| 890,319 | A | 6/1908 | Wells |
| 898,499 | A | 9/1908 | O'Donnell |
| 909,774 | A | 1/1909 | Flora |
| 919,194 | A | 4/1909 | Livingston |
| 1,037,659 | A | 9/1912 | Rembert |
| 1,100,475 | A | 6/1914 | Franckaerts |
| 1,170,512 | A | 2/1916 | Chapman |
| 1,196,758 | A | 9/1916 | Blair |
| 1,304,068 | A | 5/1919 | Krogh |
| 1,331,997 | A | 2/1920 | Neal |
| 1,185,314 | A | 3/1920 | London |
| 1,377,101 | A | 5/1921 | Sparling |
| 1,380,798 | A | 6/1921 | Hansen et al. |
| 1,439,365 | A | 12/1922 | Hazell |
| 1,454,967 | A | 5/1923 | Gill |
| 1,470,607 | A | 10/1923 | Hazell |
| 1,513,875 | A | 11/1924 | Wilke |
| 1,518,501 | A | 12/1924 | Gill |
| 1,522,765 | A | 1/1925 | Wilke |
| 1,526,851 | A | 2/1925 | Hall |
| 1,669,668 | A | 5/1928 | Marshall |
| 1,673,594 | A | 6/1928 | Schmidt |
| 1,697,202 | A | 1/1929 | Nagle |
| 1,717,969 | A | 6/1929 | Goodner |
| 1,718,396 | A | 6/1929 | Wheeler |
| 1,896,201 | A | 2/1933 | Sterner-Rainer |
| 1,988,875 | A | 1/1935 | Saborio |
| 2,013,455 | A | 9/1935 | Baxter |
| 2,035,282 | A | 3/1936 | Schmeller, Sr. |
| 2,038,221 | A | 4/1936 | Kagi |
| 2,075,633 | A | 3/1937 | Anderegg |
| 2,090,162 | A | 8/1937 | Tighe |
| 2,091,677 | A | 8/1937 | Fredericks |
| 2,138,814 | A | 12/1938 | Bressler |
| 2,173,377 | A | 9/1939 | Schultz, Jr. et al. |
| 2,264,740 | A | 12/1941 | Brown |
| 2,280,979 | A | 4/1942 | Rocke |
| 2,290,961 | A | 7/1942 | Heuer |
| 2,300,688 | A | 11/1942 | Nagle |
| 2,304,849 | A | 12/1942 | Ruthman |
| 2,368,962 | A | 2/1945 | Blom |
| 2,383,424 | A | 8/1945 | Stepanoff |
| 2,423,655 | A | 7/1947 | Mars et al. |
| 2,488,447 | A | 11/1949 | Tangen et al. |
| 2,493,467 | A | 1/1950 | Sunnen |
| 2,515,097 | A | 7/1950 | Schryber |
| 2,515,478 | A | 7/1950 | Tooley et al. |
| 2,528,208 | A | 10/1950 | Bonsack et al. |
| 2,528,210 | A | 10/1950 | Stewart |
| 2,543,633 | A | 2/1951 | Lamphere |
| 2,566,892 | A | 4/1951 | Jacobs |
| 2,625,720 | A | 1/1953 | Ross |
| 2,626,086 | A | 1/1953 | Forrest |
| 2,676,279 | A | 4/1954 | Wilson |
| 2,677,609 | A | 4/1954 | Moore et al. |
| 2,698,583 | A | 1/1955 | House et al. |
| 2,714,354 | A | 8/1955 | Farrand |
| 2,762,095 | A | 9/1956 | Pemetzrieder |
| 2,768,587 | A | 10/1956 | Corneil |
| 2,775,348 | A | 12/1956 | Williams |
| 2,779,574 | A | 1/1957 | Schneider |
| 2,787,873 | A | 4/1957 | Hadley |
| 2,808,782 | A | 10/1957 | Thompson et al. |
| 2,809,107 | A | 10/1957 | Russell |
| 2,821,472 | A | 1/1958 | Peterson et al. |
| 2,824,520 | A | 2/1958 | Bartels |
| 2,832,292 | A | 4/1958 | Edwards |
| 2,839,006 | A | 6/1958 | Mayo |
| 2,853,019 | A | 9/1958 | Thornton |
| 2,865,295 | A | 12/1958 | Nikolaus |
| 2,865,618 | A | 12/1958 | Abell |
| 2,868,132 | A | 1/1959 | Rittershofer |
| 2,901,006 | A | 8/1959 | Andrews |
| 2,901,677 | A | 8/1959 | Chessman et al. |
| 2,906,632 | A | 9/1959 | Nickerson |
| 2,918,876 | A | 12/1959 | Howe |
| 2,948,524 | A | 8/1960 | Sweeney et al. |
| 2,958,293 | A | 11/1960 | Pray, Jr. |
| 2,966,345 | A | 12/1960 | Burgoon et al. |
| 2,966,381 | A | 12/1960 | Menzel |
| 2,978,885 | A | 4/1961 | Davison |
| 2,984,524 | A | 5/1961 | Franzen |
| 2,987,885 | A | 6/1961 | Hodge |
| 3,010,402 | A | 11/1961 | King |
| 3,015,190 | A | 1/1962 | Arbeit |
| 3,039,864 | A | 6/1962 | Hess |
| 3,044,408 | A | 7/1962 | Mellott |
| 3,048,384 | A | 8/1962 | Sweeney et al. |
| 3,070,393 | A | 12/1962 | Silverberg et al. |
| 3,092,030 | A | 6/1963 | Wunder |
| 3,099,870 | A | 8/1963 | Seeler |
| 3,128,327 | A | 4/1964 | Upton |
| 3,130,678 | A | 4/1964 | Chenault |
| 3,130,679 | A | 4/1964 | Sence |
| 3,151,565 | A | 10/1964 | Albertson et al. |
| 3,171,357 | A | 3/1965 | Egger |
| 3,172,850 | A | 3/1965 | Englesberg et al. |
| 3,203,182 | A | 8/1965 | Pohl |
| 3,227,547 | A | 1/1966 | Szekely |
| 3,244,109 | A | 4/1966 | Barske |
| 3,251,676 | A | 5/1966 | Johnson |
| 3,255,702 | A | 6/1966 | Gehrm |
| 3,258,283 | A | 6/1966 | Winberg et al. |
| 3,272,619 | A | 9/1966 | Sweeney et al. |
| 3,289,473 | A | 12/1966 | Louda |
| 3,291,473 | A | 12/1966 | Sweeney et al. |
| 3,368,805 | A | 2/1968 | Davey et al. |
| 3,374,943 | A | 3/1968 | Cervenka |
| 3,400,923 | A | 9/1968 | Howie et al. |
| 3,417,929 | A | 12/1968 | Secrest et al. |
| 3,432,336 | A | 3/1969 | Langrod et al. |
| 3,459,133 | A | 8/1969 | Scheffler |
| 3,459,346 | A | 8/1969 | Tinnes |
| 3,477,383 | A | 11/1969 | Rawson et al. |
| 3,487,805 | A | 1/1970 | Satterthwaite |
| 3,512,762 | A | 5/1970 | Umbricht |

(56) References Cited

U.S. PATENT DOCUMENTS

| | | | |
|---|---|---|---|
| 3,512,788 | A | 5/1970 | Kilbane |
| 3,532,445 | A | 10/1970 | Scheffler et al. |
| 3,561,885 | A | 2/1971 | Lake |
| 3,575,525 | A | 4/1971 | Fox et al. |
| 3,581,767 | A | 6/1971 | Jackson |
| 3,612,715 | A | 10/1971 | Yedidiah |
| 3,618,917 | A | 11/1971 | Fredrikson et al. |
| 3,620,716 | A | 11/1971 | Hess |
| 3,650,730 | A | 3/1972 | Derham et al. |
| 3,689,048 | A | 9/1972 | Foulard et al. |
| 3,715,112 | A | 2/1973 | Carbonnel |
| 3,732,032 | A | 5/1973 | Daneel |
| 3,737,304 | A | 6/1973 | Blayden et al. |
| 3,737,305 | A | 6/1973 | Blayden et al. |
| 3,743,263 | A | 7/1973 | Szekely |
| 3,743,500 | A | 7/1973 | Foulard et al. |
| 3,753,690 | A | 8/1973 | Emley et al. |
| 3,759,628 | A | 9/1973 | Kempf |
| 3,759,635 | A | 9/1973 | Carter et al. |
| 3,767,382 | A | 10/1973 | Bruno et al. |
| 3,776,660 | A | 12/1973 | Anderson et al. |
| 3,785,632 | A | 1/1974 | Kraemer et al. |
| 3,787,143 | A | 1/1974 | Carbonnel et al. |
| 3,799,522 | A | 3/1974 | Brant et al. |
| 3,799,523 | A | 3/1974 | Seki |
| 3,807,708 | A | 4/1974 | Jones |
| 3,814,400 | A | 6/1974 | Seki |
| 3,824,028 | A | 7/1974 | Zenkner et al. |
| 3,824,042 | A | 7/1974 | Barnes et al. |
| 3,836,280 | A | 9/1974 | Koch |
| 3,839,019 | A | 10/1974 | Bruno et al. |
| 3,844,972 | A | 10/1974 | Tully, Jr. et al. |
| 3,871,872 | A | 3/1975 | Downing et al. |
| 3,873,073 | A | 3/1975 | Baum et al. |
| 3,873,305 | A | 3/1975 | Claxton et al. |
| 3,881,039 | A | 4/1975 | Baldieri et al. |
| 3,886,992 | A | 6/1975 | Maas et al. |
| 3,915,594 | A | 10/1975 | Nesseth |
| 3,915,694 | A | 10/1975 | Ando |
| 3,935,003 | A | 1/1976 | Steinke et al. |
| 3,941,588 | A | 3/1976 | Dremann |
| 3,941,589 | A | 3/1976 | Norman et al. |
| 3,942,473 | A | 3/1976 | Chodash |
| 3,954,134 | A | 5/1976 | Maas et al. |
| 3,958,979 | A | 5/1976 | Valdo |
| 3,958,981 | A | 5/1976 | Forberg et al. |
| 3,961,778 | A | 6/1976 | Carbonnel et al. |
| 3,966,456 | A | 6/1976 | Ellenbaum et al. |
| 3,967,286 | A | 6/1976 | Andersson et al. |
| 3,972,709 | A | 8/1976 | Chin et al. |
| 3,973,871 | A | 8/1976 | Hance |
| 3,984,234 | A | 10/1976 | Claxton et al. |
| 3,985,000 | A | 10/1976 | Hartz |
| 3,997,336 | A | 12/1976 | van Linden et al. |
| 4,003,560 | A | 1/1977 | Carbonnel |
| 4,008,884 | A | 2/1977 | Fitzpatrick et al. |
| 4,018,598 | A | 4/1977 | Markus |
| 4,043,146 | A | 8/1977 | Stegherr et al. |
| 4,052,199 | A | 10/1977 | Mangalick |
| 4,055,390 | A | 10/1977 | Young |
| 4,063,849 | A | 12/1977 | Modianos |
| 4,068,965 | A | 1/1978 | Lichti |
| 4,073,606 | A | 2/1978 | Eller |
| 4,091,970 | A | 5/1978 | Komiyama et al. |
| 4,119,141 | A | 10/1978 | Thut et al. |
| 4,125,146 | A | 11/1978 | Muller |
| 4,126,360 | A | 11/1978 | Miller et al. |
| 4,128,415 | A | 12/1978 | van Linden et al. |
| 4,147,474 | A | 4/1979 | Heimdal et al. |
| 4,169,584 | A | 10/1979 | Mangalick |
| 4,191,486 | A | 3/1980 | Pelton |
| 4,213,742 | A | 7/1980 | Henshaw |
| 4,242,039 | A | 12/1980 | Villard et al. |
| 4,244,423 | A | 1/1981 | Thut et al. |
| 4,286,985 | A | 9/1981 | van Linden et al. |
| 4,305,214 | A | 12/1981 | Hurst |
| 4,322,245 | A | 3/1982 | Claxton |
| 4,338,062 | A | 7/1982 | Neal |
| 4,347,041 | A | 8/1982 | Cooper |
| 4,351,514 | A | 9/1982 | Koch |
| 4,355,789 | A | 10/1982 | Dolzhenkov et al. |
| 4,356,940 | A | 11/1982 | Ansorge |
| 4,360,314 | A | 11/1982 | Pennell |
| 4,370,096 | A | 1/1983 | Church |
| 4,372,541 | A | 2/1983 | Bocourt et al. |
| 4,375,937 | A | 3/1983 | Cooper |
| 4,389,159 | A | 6/1983 | Sarvanne |
| 4,392,888 | A | 7/1983 | Eckert et al. |
| 4,410,299 | A | 10/1983 | Shimoyama |
| 4,419,049 | A | 12/1983 | Gerboth et al. |
| 4,456,424 | A | 6/1984 | Araoka |
| 4,470,846 | A | 9/1984 | Dube |
| 4,474,315 | A | 10/1984 | Gilbert et al. |
| 4,496,393 | A | 1/1985 | Lustenberger |
| 4,504,392 | A | 3/1985 | Groteke |
| 4,509,979 | A | 4/1985 | Bauer |
| 4,530,641 | A | 7/1985 | Gschwender |
| 4,537,624 | A | 8/1985 | Tenhover et al. |
| 4,537,625 | A | 8/1985 | Tenhover et al. |
| 4,545,887 | A | 10/1985 | Arnesen |
| 4,556,419 | A | 12/1985 | Otsuka et al. |
| 4,557,766 | A | 12/1985 | Tenhover et al. |
| 4,586,845 | A | 5/1986 | Morris |
| 4,592,700 | A | 6/1986 | Toguchi et al. |
| 4,594,052 | A | 6/1986 | Niskanen |
| 4,596,510 | A | 6/1986 | Arneth et al. |
| 4,598,899 | A | 7/1986 | Cooper |
| 4,600,222 | A | 7/1986 | Appling |
| 4,607,825 | A | 8/1986 | Briolle et al. |
| 4,609,442 | A | 9/1986 | Tenhover et al. |
| 4,611,790 | A | 9/1986 | Otsuka et al. |
| 4,617,232 | A | 10/1986 | Chandler et al. |
| 4,634,105 | A | 1/1987 | Withers et al. |
| 4,640,666 | A | 2/1987 | Sodergard |
| 4,655,610 | A | 4/1987 | Al-Jaroudi |
| 4,668,166 | A | 5/1987 | Lutz |
| 4,669,953 | A | 6/1987 | Gechwender |
| 4,673,434 | A | 6/1987 | Withers et al. |
| 4,682,585 | A | 7/1987 | Hiltebrandt |
| 4,684,281 | A | 8/1987 | Patterson |
| 4,685,822 | A | 8/1987 | Pelton |
| 4,696,703 | A | 9/1987 | Henderson et al. |
| 4,701,226 | A | 10/1987 | Henderson et al. |
| 4,702,768 | A | 10/1987 | Areauz et al. |
| 4,714,371 | A | 12/1987 | Cuse |
| 4,717,540 | A | 1/1988 | McRae et al. |
| 4,739,974 | A | 4/1988 | Mordue |
| 4,741,664 | A | 5/1988 | Olmstead |
| 4,743,428 | A | 5/1988 | McRae et al. |
| 4,747,583 | A | 5/1988 | Gordon et al. |
| 4,767,230 | A | 8/1988 | Leas, Jr. |
| 4,770,701 | A | 9/1988 | Henderson et al. |
| 4,786,230 | A | 11/1988 | Thut |
| 4,802,656 | A | 2/1989 | Hudault et al. |
| 4,804,168 | A | 2/1989 | Otsuka et al. |
| 4,810,314 | A | 3/1989 | Henderson et al. |
| 4,822,473 | A | 4/1989 | Arnesen |
| 4,834,573 | A | 5/1989 | Asano et al. |
| 4,842,227 | A | 6/1989 | Harrington et al. |
| 4,844,425 | A | 7/1989 | Piras et al. |
| 4,851,296 | A | 7/1989 | Tenhover et al. |
| 4,854,834 | A | 8/1989 | Gschwender et al. |
| 4,859,413 | A | 8/1989 | Harris et al. |
| 4,860,819 | A | 8/1989 | Moscoe et al. |
| 4,867,638 | A | 9/1989 | Handtmann et al. |
| 4,884,786 | A | 12/1989 | Gillespie |
| 4,898,367 | A | 2/1990 | Cooper |
| 4,908,060 | A | 3/1990 | Duenkelmann |
| 4,909,704 | A | 3/1990 | Lutz |
| 4,911,726 | A | 3/1990 | Warkentin |
| 4,923,770 | A | 5/1990 | Grasselli et al. |
| 4,930,986 | A | 6/1990 | Cooper |
| 4,931,091 | A | 6/1990 | Waite et al. |
| 4,940,214 | A | 7/1990 | Gillespie |

(56) References Cited

U.S. PATENT DOCUMENTS 4,940,384 A 7/1990 Amra et al.
4,954,167 A 9/1990 Cooper
4,967,827 A 11/1990 Campbell
4,973,433 A 11/1990 Gilbert et al.
4,986,736 A 1/1991 Kajiwara et al.
4,989,736 A 2/1991 Andersson et al.
5,015,518 A 5/1991 Sasaki et al.
5,025,198 A 6/1991 Mordue et al.
5,028,211 A 7/1991 Mordue et al.
5,029,821 A 7/1991 Bar-on et al.
5,058,654 A 10/1991 Simmons
5,078,572 A 1/1992 Amra et al.
5,080,715 A 1/1992 Provencher et al.
5,083,753 A 1/1992 Soofi
5,088,893 A 2/1992 Gilbert et al.
5,092,821 A 3/1992 Gilbert et al.
5,098,134 A 3/1992 Monckton
5,099,554 A 3/1992 Cooper
5,114,312 A 5/1992 Stanislao
5,126,047 A 6/1992 Martin et al.
5,131,632 A 7/1992 Olson
5,135,202 A 8/1992 Yamashita et al.
5,143,357 A 9/1992 Gilbert et al.
5,145,322 A 9/1992 Senior, Jr. et al.
5,152,631 A 10/1992 Bauer
5,154,652 A 10/1992 Ecklesdafer
5,158,440 A 10/1992 Cooper et al.
5,162,858 A 11/1992 Shoji et al.
5,165,858 A 11/1992 Gilbert et al.
5,177,304 A 1/1993 Nagel
5,191,154 A 3/1993 Nagel
5,192,193 A 3/1993 Cooper et al.
5,202,100 A 4/1993 Nagel et al.
5,203,681 A 4/1993 Cooper
5,209,641 A 5/1993 Hoglund et al.
5,215,448 A 6/1993 Cooper
5,268,020 A 12/1993 Claxton
5,286,163 A 2/1994 Amra et al.
5,298,233 A 3/1994 Nagel
5,301,620 A 4/1994 Nagel et al.
5,303,903 A 4/1994 Butler et al.
5,308,045 A 5/1994 Cooper
5,310,412 A 5/1994 Gilbert et al.
5,318,360 A 6/1994 Langer et al.
5,322,547 A 6/1994 Nagel et al.
5,324,341 A 6/1994 Nagel et al.
5,330,328 A 7/1994 Cooper
5,354,940 A 10/1994 Nagel
5,358,549 A 10/1994 Nagel et al.
5,358,697 A 10/1994 Nagel
5,364,078 A 11/1994 Pelton
5,369,063 A 11/1994 Gee et al.
5,383,651 A 1/1995 Blasen et al.
5,388,633 A 2/1995 Mercer, II et al.
5,395,405 A 3/1995 Nagel et al.
5,399,074 A 3/1995 Nose et al.
5,407,294 A 4/1995 Giannini
5,411,240 A 5/1995 Rapp et al.
5,425,410 A 6/1995 Reynolds
5,431,551 A 7/1995 Aquino et al.
5,435,982 A 7/1995 Wilkinson
5,436,210 A 7/1995 Wilkinson et al.
5,443,572 A 8/1995 Wilkinson et al.
5,454,423 A 10/1995 Tsuchida et al.
5,468,280 A 11/1995 Areaux
5,470,201 A 11/1995 Gilbert et al.
5,484,265 A 1/1996 Horvath et al.
5,489,734 A 2/1996 Nagel et al.
5,491,279 A 2/1996 Robert et al.
5,494,382 A 2/1996 Kloppers
5,495,746 A 3/1996 Sigworth
5,505,143 A 4/1996 Nagel
5,505,435 A 4/1996 Laszlo
5,509,791 A 4/1996 Turner
5,511,766 A 4/1996 Vassilicos
5,520,422 A 5/1996 Friedrich
5,537,940 A 7/1996 Nagel et al.
5,543,558 A 8/1996 Nagel et al.
5,555,822 A 9/1996 Loewen et al.
5,558,501 A 9/1996 Wang et al.
5,558,505 A 9/1996 Mordue et al.
5,571,486 A 11/1996 Robert et al.
5,585,532 A 12/1996 Nagel
5,586,863 A 12/1996 Gilbert et al.
5,591,243 A 1/1997 Colussi et al.
5,597,289 A 1/1997 Thut
5,613,245 A 3/1997 Robert
5,616,167 A 4/1997 Eckert
5,622,481 A 4/1997 Thut
5,629,464 A 5/1997 Bach et al.
5,634,770 A 6/1997 Gilbert et al.
5,640,706 A 6/1997 Nagel et al.
5,640,707 A 6/1997 Nagel et al.
5,640,709 A 6/1997 Nagel et al.
5,655,849 A 8/1997 McEwen et al.
5,660,614 A 8/1997 Waite et al.
5,662,725 A 9/1997 Cooper
5,676,520 A 10/1997 Thut
5,678,244 A 10/1997 Shaw et al.
5,678,807 A 10/1997 Cooper
5,679,132 A 10/1997 Rauenzahn et al.
5,685,701 A 11/1997 Chandler et al.
5,690,888 A 11/1997 Robert
5,695,732 A 12/1997 Sparks et al.
5,716,195 A 2/1998 Thut
5,717,149 A 2/1998 Nagel et al.
5,718,416 A 2/1998 Flisakowski et al.
5,735,668 A 4/1998 Klein
5,735,935 A 4/1998 Areaux
5,741,422 A 4/1998 Eichenmiller et al.
5,744,093 A 4/1998 Davis
5,744,117 A 4/1998 Wilkinson et al.
5,745,861 A 4/1998 Bell et al.
5,755,847 A 5/1998 Quayle
5,758,712 A 6/1998 Pederson
5,772,324 A 6/1998 Falk
5,776,420 A 7/1998 Nagel
5,785,494 A 7/1998 Vild et al.
5,842,832 A 12/1998 Thut
5,846,481 A 12/1998 Tilak
5,858,059 A 1/1999 Abramovich et al.
5,863,314 A 1/1999 Morando
5,866,095 A 2/1999 McGeever et al.
5,875,385 A 2/1999 Stephenson et al.
5,935,528 A 8/1999 Stephenson et al.
5,944,496 A 8/1999 Cooper
5,947,705 A 9/1999 Mordue et al.
5,948,352 A 9/1999 Jagt et al.
5,951,243 A 9/1999 Cooper
5,961,285 A 10/1999 Meneice et al.
5,963,580 A 10/1999 Eckert
5,992,230 A 11/1999 Scarpa et al.
5,993,726 A 11/1999 Huang
5,993,728 A 11/1999 Vild
6,007,313 A 12/1999 Siegel
6,019,576 A 2/2000 Thut
6,027,685 A 2/2000 Cooper
6,036,745 A 3/2000 Gilbert et al.
6,074,455 A 6/2000 van Linden et al.
6,082,965 A 7/2000 Morando
6,093,000 A 7/2000 Cooper
6,096,109 A 8/2000 Nagel et al.
6,113,154 A 9/2000 Thut
6,123,523 A 9/2000 Cooper
6,152,691 A 11/2000 Thut
6,168,753 B1 1/2001 Morando
6,187,096 B1 2/2001 Thut
6,199,836 B1 3/2001 Rexford et al.
6,217,823 B1 4/2001 Vild et al.
6,231,639 B1 5/2001 Eichenmiller
6,250,881 B1 6/2001 Mordue et al.
6,254,340 B1 7/2001 Vild et al.
6,270,717 B1 8/2001 Tremblay et al.
6,280,157 B1 8/2001 Cooper

(56) References Cited

U.S. PATENT DOCUMENTS

| | | | |
|---|---|---|---|
| 6,293,759 | B1 | 9/2001 | Thut |
| 6,303,074 | B1 | 10/2001 | Cooper |
| 6,345,964 | B1 | 2/2002 | Cooper |
| 6,354,796 | B1 | 3/2002 | Morando |
| 6,358,467 | B1 | 3/2002 | Mordue |
| 6,364,930 | B1 | 4/2002 | Kos |
| 6,371,723 | B1 | 4/2002 | Grant et al. |
| 6,398,525 | B1 | 6/2002 | Cooper |
| 6,439,860 | B1 | 8/2002 | Greer |
| 6,451,247 | B1 | 9/2002 | Mordue et al. |
| 6,457,940 | B1 | 10/2002 | Lehman |
| 6,457,950 | B1 | 10/2002 | Cooper et al. |
| 6,464,458 | B2 | 10/2002 | Vild et al. |
| 6,474,962 | B1 | 11/2002 | Allen et al. |
| 6,495,948 | B1 | 12/2002 | Garrett, III |
| 6,497,559 | B1 | 12/2002 | Grant |
| 6,500,228 | B1 | 12/2002 | Klingensmith et al. |
| 6,503,292 | B2 | 1/2003 | Klingensmith et al. |
| 6,524,066 | B2 | 2/2003 | Thut |
| 6,533,535 | B2 | 3/2003 | Thut |
| 6,551,060 | B2 | 4/2003 | Mordue et al. |
| 6,562,286 | B1 | 5/2003 | Lehman |
| 6,656,415 | B2 | 12/2003 | Kos |
| 6,679,936 | B2 | 1/2004 | Quackenbush |
| 6,689,310 | B1 | 2/2004 | Cooper |
| 6,709,234 | B2 | 3/2004 | Gilbert et al. |
| 6,716,147 | B1 | 4/2004 | Hinkle et al. |
| 6,723,276 | B1 | 4/2004 | Cooper |
| 6,805,834 | B2 | 10/2004 | Thut |
| 6,843,640 | B2 | 1/2005 | Mordue et al. |
| 6,848,497 | B2 | 2/2005 | Sale et al. |
| 6,869,271 | B2 | 3/2005 | Gilbert et al. |
| 6,869,564 | B2 | 3/2005 | Gilbert et al. |
| 6,881,030 | B2 | 4/2005 | Thut |
| 6,887,424 | B2 | 5/2005 | Ohno et al. |
| 6,887,425 | B2 | 5/2005 | Mordue et al. |
| 6,902,696 | B2 | 6/2005 | Klingensmith et al. |
| 7,037,462 | B2 | 5/2006 | Klingensmith et al. |
| 7,074,361 | B2 | 7/2006 | Carolla et al. |
| 7,083,758 | B2 | 8/2006 | Tremblay |
| 7,131,482 | B2 | 11/2006 | Vincent et al. |
| 7,157,043 | B2 | 1/2007 | Neff |
| 7,204,954 | B2 | 4/2007 | Mizuno |
| 7,273,582 | B2 | 9/2007 | Mordue |
| 7,279,128 | B2 | 10/2007 | Kennedy et al. |
| 7,326,028 | B2 | 2/2008 | Morando |
| 7,402,276 | B2 | 7/2008 | Cooper |
| 7,470,392 | B2 | 12/2008 | Cooper |
| 7,476,357 | B2 | 1/2009 | Thut |
| 7,481,966 | B2 | 1/2009 | Mizuno |
| 7,497,988 | B2 | 3/2009 | Thut |
| 7,507,365 | B2 | 3/2009 | Thut |
| 7,507,367 | B2 | 3/2009 | Cooper |
| 7,543,605 | B1 | 6/2009 | Morando |
| 7,731,891 | B2 | 6/2010 | Cooper |
| 7,771,171 | B2 | 8/2010 | Mohr |
| 7,841,379 | B1 | 11/2010 | Evans |
| 7,896,617 | B1 | 3/2011 | Morando |
| 7,906,068 | B2 | 3/2011 | Cooper |
| 8,075,837 | B2 | 12/2011 | Cooper |
| 8,110,141 | B2 | 2/2012 | Cooper |
| 8,137,023 | B2 | 3/2012 | Greer |
| 8,142,145 | B2 | 3/2012 | Thut |
| 8,178,037 | B2 | 5/2012 | Cooper |
| 8,328,540 | B2 | 12/2012 | Wang |
| 8,333,921 | B2 | 12/2012 | Thut |
| 8,337,746 | B2 | 12/2012 | Cooper |
| 8,361,379 | B2 | 1/2013 | Cooper |
| 8,366,993 | B2 | 2/2013 | Cooper |
| 8,409,495 | B2 | 4/2013 | Cooper |
| 8,440,135 | B2 | 5/2013 | Cooper |
| 8,444,911 | B2 | 5/2013 | Cooper |
| 8,449,814 | B2 | 5/2013 | Cooper |
| 8,475,594 | B2 | 7/2013 | Bright et al. |
| 8,475,708 | B2 | 7/2013 | Cooper |
| 8,480,950 | B2 | 7/2013 | Jetten et al. |
| 8,501,084 | B2 | 8/2013 | Cooper |
| 8,524,146 | B2 | 9/2013 | Cooper |
| 8,529,828 | B2 | 9/2013 | Cooper |
| 8,535,603 | B2 | 9/2013 | Cooper |
| 8,580,218 | B2 | 11/2013 | Turenne et al. |
| 8,613,884 | B2 | 12/2013 | Cooper |
| 8,714,914 | B2 | 5/2014 | Cooper |
| 8,753,563 | B2 | 6/2014 | Cooper |
| 8,840,359 | B2 | 9/2014 | Vick et al. |
| 8,899,932 | B2 | 12/2014 | Tetkoskie et al. |
| 8,915,830 | B2 | 12/2014 | March et al. |
| 8,920,680 | B2 | 12/2014 | Mao |
| 9,011,761 | B2 | 4/2015 | Cooper |
| 9,017,597 | B2 | 4/2015 | Cooper |
| 9,034,244 | B2 | 5/2015 | Cooper |
| 9,057,376 | B2 | 6/2015 | Thut |
| 9,057,377 | B1 | 6/2015 | Thut |
| 9,074,601 | B1 | 7/2015 | Thut |
| 9,080,577 | B2 | 7/2015 | Cooper |
| 9,108,224 | B2 | 8/2015 | Schererz et al. |
| 9,108,244 | B2 | 8/2015 | Cooper |
| 9,156,087 | B2 | 10/2015 | Cooper |
| 9,193,532 | B2 | 11/2015 | March et al. |
| 9,205,490 | B2 | 12/2015 | Cooper |
| 9,234,520 | B2 | 1/2016 | Morando |
| 9,273,376 | B2 | 3/2016 | Lutes et al. |
| 9,328,615 | B2 | 5/2016 | Cooper |
| 9,377,028 | B2 | 6/2016 | Cooper |
| 9,382,599 | B2 | 7/2016 | Cooper |
| 9,383,140 | B2 | 7/2016 | Cooper |
| 9,388,925 | B2 | 7/2016 | Juarez |
| 9,409,232 | B2 | 8/2016 | Cooper |
| 9,410,744 | B2 | 8/2016 | Cooper |
| 9,422,942 | B2 | 8/2016 | Cooper |
| 9,435,343 | B2 | 9/2016 | Cooper |
| 9,464,636 | B2 | 10/2016 | Cooper |
| 9,470,239 | B2 | 10/2016 | Cooper |
| 9,476,644 | B2 | 10/2016 | Howitt et al. |
| 9,481,035 | B2 | 11/2016 | Cooper |
| 9,481,918 | B2 | 11/2016 | Vild et al. |
| 9,482,469 | B2 | 11/2016 | Cooper |
| 9,494,366 | B1 | 11/2016 | Thut |
| 9,506,129 | B2 | 11/2016 | Cooper |
| 9,506,346 | B2 | 11/2016 | Bright et al. |
| 9,532,670 | B2 | 1/2017 | Vanessen |
| 9,566,645 | B2 | 2/2017 | Cooper |
| 9,581,388 | B2 | 2/2017 | Cooper |
| 9,587,883 | B2 | 3/2017 | Cooper |
| 9,632,670 | B2 | 4/2017 | Wu et al. |
| 9,643,247 | B2 | 5/2017 | Cooper et al. |
| 9,657,578 | B2 | 5/2017 | Cooper |
| 9,855,600 | B2 | 1/2018 | Cooper |
| 9,862,026 | B2 | 1/2018 | Cooper |
| 9,903,383 | B2 | 2/2018 | Cooper |
| 9,909,808 | B2 | 3/2018 | Cooper |
| 9,920,767 | B2 | 3/2018 | Klain et al. |
| 9,925,587 | B2 | 3/2018 | Cooper |
| 9,951,777 | B2 | 4/2018 | Morando et al. |
| 9,970,442 | B2 | 5/2018 | Tipton |
| 9,982,945 | B2 | 5/2018 | Cooper |
| 10,052,688 | B2 | 8/2018 | Cooper |
| 10,072,897 | B2 | 9/2018 | Cooper |
| 10,126,058 | B2 | 11/2018 | Cooper |
| 10,126,059 | B2 | 11/2018 | Cooper |
| 10,138,892 | B2 | 11/2018 | Cooper |
| 10,195,664 | B2 | 2/2019 | Cooper et al. |
| 10,267,314 | B2 | 4/2019 | Cooper |
| 10,274,256 | B2 | 4/2019 | Cooper |
| 10,302,361 | B2 | 5/2019 | Cooper |
| 10,307,821 | B2 | 6/2019 | Cooper |
| 10,309,725 | B2 | 6/2019 | Cooper |
| 10,322,451 | B2 | 6/2019 | Cooper |
| 10,345,045 | B2 | 7/2019 | Cooper |
| 10,352,620 | B2 | 7/2019 | Cooper |
| 10,428,821 | B2 | 10/2019 | Cooper |
| 10,458,708 | B2 | 10/2019 | Cooper |
| 10,465,688 | B2 | 11/2019 | Cooper |
| 10,562,097 | B2 | 2/2020 | Cooper |

(56) References Cited

U.S. PATENT DOCUMENTS 10,570,745 B2 2/2020 Cooper
10,641,270 B2 5/2020 Cooper
10,641,279 B2 5/2020 Cooper
10,675,679 B2 6/2020 Cooper
11,020,798 B2 6/2021 Cooper
11,098,719 B2 8/2021 Cooper
11,098,720 B2 8/2021 Cooper
11,103,920 B2 8/2021 Cooper
11,130,173 B2 9/2021 Cooper
11,149,747 B2 10/2021 Cooper
11,167,345 B2 11/2021 Cooper
11,185,916 B2 11/2021 Cooper
11,286,939 B2 3/2022 Cooper
11,358,216 B2 6/2022 Cooper
11,358,217 B2 6/2022 Cooper
11,391,293 B2 7/2022 Cooper
11,471,938 B2 * 10/2022 Fontana ................ B22D 41/00
11,519,414 B2 12/2022 Cooper
2001/0000465 A1 4/2001 Thut
2002/0089099 A1 7/2002 Denning
2002/0102159 A1 8/2002 Thut
2002/0146313 A1 10/2002 Thut
2002/0185790 A1 12/2002 Kilgensmith
2002/0185794 A1 12/2002 Vincent
2003/0047850 A1 3/2003 Areaux
2003/0075844 A1 4/2003 Mordue et al.
2003/0082052 A1 5/2003 Gilbert et al.
2003/0151176 A1 8/2003 Ohno
2003/0201583 A1 10/2003 Klingensmith
2004/0050525 A1 3/2004 Kennedy et al.
2004/0076533 A1 4/2004 Cooper
2004/0096330 A1 5/2004 Gilbert
2004/0115079 A1 6/2004 Cooper
2004/0245684 A1 12/2004 Kojo
2004/0262825 A1 12/2004 Cooper
2005/0013713 A1 1/2005 Cooper
2005/0013714 A1 1/2005 Cooper
2005/0013715 A1 1/2005 Cooper
2005/0053499 A1 3/2005 Cooper
2005/0077730 A1 4/2005 Thut
2005/0081607 A1 4/2005 Patel et al.
2005/0116398 A1 6/2005 Tremblay
2006/0180963 A1 8/2006 Thut
2006/0198725 A1 9/2006 Thut
2007/0253807 A1 11/2007 Cooper
2008/0163999 A1 7/2008 Hymas et al.
2008/0202644 A1 8/2008 Grassi
2008/0211147 A1 9/2008 Cooper
2008/0213111 A1 9/2008 Cooper
2008/0230966 A1 9/2008 Cooper
2008/0253905 A1 10/2008 Morando et al.
2008/0304970 A1 12/2008 Cooper
2008/0314548 A1 12/2008 Cooper
2009/0054167 A1 2/2009 Cooper
2009/0140013 A1 6/2009 Cooper
2009/0269191 A1 10/2009 Cooper
2010/0104415 A1 4/2010 Morando
2010/0200354 A1 8/2010 Yagi et al.
2011/0133374 A1 6/2011 Cooper
2011/0140318 A1 6/2011 Reeves et al.
2011/0140319 A1 6/2011 Cooper
2011/0140619 A1 6/2011 Lin
2011/0142603 A1 6/2011 Cooper
2011/0142606 A1 6/2011 Cooper
2011/0148012 A1 6/2011 Cooper
2011/0163486 A1 7/2011 Cooper
2011/0210232 A1 9/2011 Cooper
2011/0220771 A1 9/2011 Cooper
2011/0227338 A1 9/2011 Pollack
2011/0303706 A1 12/2011 Cooper
2012/0003099 A1 1/2012 Tetkoskie
2012/0163959 A1 6/2012 Morando
2013/0105102 A1 5/2013 Cooper
2013/0142625 A1 6/2013 Cooper
2013/0214014 A1 8/2013 Cooper
2013/0224038 A1 8/2013 Tetkoskie et al.
2013/0292426 A1 11/2013 Cooper
2013/0292427 A1 11/2013 Cooper
2013/0299524 A1 11/2013 Cooper
2013/0299525 A1 11/2013 Cooper
2013/0306687 A1 11/2013 Cooper
2013/0334744 A1 12/2013 Tremblay
2013/0343904 A1 12/2013 Cooper
2014/0008849 A1 1/2014 Cooper
2014/0041252 A1 2/2014 Vild et al.
2014/0044520 A1 2/2014 Tipton
2014/0083253 A1 3/2014 Lutes et al.
2014/0210144 A1 7/2014 Torres et al.
2014/0232048 A1 8/2014 Howitt et al.
2014/0252697 A1 9/2014 Rauch
2014/0252701 A1 9/2014 Cooper
2014/0261800 A1 9/2014 Cooper
2014/0263482 A1 9/2014 Cooper
2014/0265068 A1 9/2014 Cooper
2014/0271219 A1 9/2014 Cooper
2014/0363309 A1 12/2014 Henderson et al.
2015/0069679 A1 3/2015 Henderson et al.
2015/0184311 A1 7/2015 Turenne
2015/0192364 A1 7/2015 Cooper
2015/0217369 A1 8/2015 Cooper
2015/0219111 A1 8/2015 Cooper
2015/0219112 A1 8/2015 Cooper
2015/0219113 A1 8/2015 Cooper
2015/0219114 A1 8/2015 Cooper
2015/0224574 A1 8/2015 Cooper
2015/0252807 A1 9/2015 Cooper
2015/0285557 A1 10/2015 Cooper
2015/0285558 A1 10/2015 Cooper
2015/0323256 A1 11/2015 Cooper
2015/0328682 A1 11/2015 Cooper
2015/0328683 A1 11/2015 Cooper
2016/0031007 A1 2/2016 Cooper
2016/0040265 A1 2/2016 Cooper
2016/0047602 A1 2/2016 Cooper
2016/0053762 A1 2/2016 Cooper
2016/0053814 A1 2/2016 Cooper
2016/0082507 A1 3/2016 Cooper
2016/0089718 A1 3/2016 Cooper
2016/0091251 A1 3/2016 Cooper
2016/0116216 A1 4/2016 Schlicht et al.
2016/0221855 A1 8/2016 Retorick et al.
2016/0250686 A1 9/2016 Cooper
2016/0265535 A1 9/2016 Cooper
2016/0305711 A1 10/2016 Cooper
2016/0320129 A1 11/2016 Cooper
2016/0320130 A1 11/2016 Cooper
2016/0320131 A1 11/2016 Cooper
2016/0346836 A1 12/2016 Henderson et al.
2016/0348973 A1 12/2016 Cooper
2016/0348974 A1 12/2016 Cooper
2016/0348975 A1 12/2016 Cooper
2017/0037852 A1 2/2017 Bright et al.
2017/0038146 A1 2/2017 Cooper
2017/0045298 A1 2/2017 Cooper
2017/0056973 A1 3/2017 Tremblay et al.
2017/0082368 A1 3/2017 Cooper
2017/0106435 A1 4/2017 Vincent
2017/0106441 A1 4/2017 Vincent
2017/0130298 A1 5/2017 Teranishi et al.
2017/0167793 A1 6/2017 Cooper et al.
2017/0198721 A1 7/2017 Cooper
2017/0219289 A1 8/2017 Williams et al.
2017/0241713 A1 8/2017 Henderson et al.
2017/0246681 A1 8/2017 Tipton et al.
2017/0276430 A1 9/2017 Cooper
2018/0058465 A1 3/2018 Cooper
2018/0111189 A1 4/2018 Cooper
2018/0178281 A1 6/2018 Cooper
2018/0195513 A1 7/2018 Cooper
2018/0311726 A1 11/2018 Cooper
2019/0032675 A1 1/2019 Cooper
2019/0270134 A1 9/2019 Cooper
2019/0293089 A1 9/2019 Cooper
2019/0351481 A1 11/2019 Tetkoskie

(56) References Cited

U.S. PATENT DOCUMENTS

| | | | | |
|---|---|---|---|---|
| 2019/0360491 | A1 | 11/2019 | Cooper | |
| 2019/0360492 | A1 | 11/2019 | Cooper | |
| 2019/0368494 | A1 | 12/2019 | Cooper | |
| 2020/0130050 | A1 | 4/2020 | Cooper | |
| 2020/0130051 | A1 | 4/2020 | Cooper | |
| 2020/0130052 | A1 | 4/2020 | Cooper | |
| 2020/0130053 | A1 | 4/2020 | Cooper | |
| 2020/0130054 | A1 | 4/2020 | Cooper | |
| 2020/0182247 | A1 | 6/2020 | Cooper | |
| 2020/0182248 | A1 | 6/2020 | Cooper | |
| 2020/0256350 | A1 | 8/2020 | Cooper | |
| 2020/0360987 | A1 | 11/2020 | Cooper | |
| 2020/0360988 | A1 | 11/2020 | Fontana | |
| 2020/0360989 | A1 | 11/2020 | Cooper | |
| 2020/0360990 | A1 | 11/2020 | Cooper | |
| 2020/0362865 | A1 | 11/2020 | Cooper | |
| 2020/0363128 | A1 | 11/2020 | Cooper | |
| 2021/0199115 | A1 | 7/2021 | Cooper | |
| 2021/0254622 | A1 | 8/2021 | Cooper | |
| 2022/0025905 | A1 | 1/2022 | Cooper | |
| 2022/0080498 | A1 | 3/2022 | Cooper | |
| 2022/0193764 | A1 | 6/2022 | Cooper | |
| 2022/0213895 | A1 | 7/2022 | Cooper | |
| 2022/0234099 | A1 | 7/2022 | Cooper | |
| 2022/0381246 | A1 | 12/2022 | Cooper | |
| 2023/0001474 | A1* | 1/2023 | Fontana | B22D 39/02 |
| 2023/0219132 | A1 | 7/2023 | Cooper | |

FOREIGN PATENT DOCUMENTS

| | | | |
|---|---|---|---|
| CA | 2244251 | | 6/1998 |
| CA | 2305865 | | 2/2000 |
| CA | 2176475 | | 7/2005 |
| CA | 2924572 | | 4/2015 |
| CH | 392268 | | 9/1965 |
| CN | 102943761 | A | 2/2013 |
| CN | 103511331 | A | 1/2014 |
| DE | 1800446 | | 12/1969 |
| DE | 19541093 | A1 | 5/1997 |
| DE | 19614350 | A1 | 10/1997 |
| DE | 102006051814 | B3 | 7/2008 |
| EP | 168250 | | 1/1986 |
| EP | 665378 | | 8/1995 |
| EP | 1019635 | | 6/2006 |
| GB | 543607 | | 3/1942 |
| GB | 942648 | | 11/1963 |
| GB | 1185314 | | 3/1970 |
| GB | 1565911 | A | 4/1980 |
| GB | 1575991 | A | 10/1980 |
| GB | 212260 | A | 1/1984 |
| GB | 2193257 | A | 2/1988 |
| GB | 2217784 | | 3/1989 |
| GB | 2289919 | A | 12/1995 |
| JP | 58048796 | | 3/1983 |
| JP | 63104773 | | 5/1988 |
| JP | 11-270799 | | 10/1999 |
| JP | 5112837 | | 1/2013 |
| MX | 227385 | | 4/2005 |
| NO | 90756 | | 1/1959 |
| SU | 416401 | | 2/1974 |
| SU | 773312 | | 10/1980 |
| WO | 199808990 | | 3/1998 |
| WO | 199825031 | | 6/1998 |
| WO | 200009889 | | 2/2000 |
| WO | 2002012147 | | 2/2002 |
| WO | 2004029307 | | 4/2004 |
| WO | 2010147932 | | 12/2010 |
| WO | 2014031484 | A2 | 2/2014 |
| WO | 2014055082 | | 4/2014 |
| WO | 2014150503 | | 9/2014 |
| WO | 2014185971 | | 11/2014 |

OTHER PUBLICATIONS

Document No. 504217: Excerpts from "Pyrotek Inc.'s Motion for Summary Judgment of Invalidity and Unenforceability of U.S. Pat. No. 7,402,276," Oct. 2, 2009.

Document No. 505026: Excerpts from "MMEI's Response to Pyrotek's Motion for Summary Judgment of Invalidity or Enforceability of U.S. Pat. No. 7,402,276," Oct. 9, 2009.

Document No. 507689: Excerpts from "MMEI's Pre-Hearing Brief and Supplemental Motion for Summary Judgment of Infringement of Claims 3, 4, 15, 17-20, 26, 28 and 29 of the '074 Patent and Motion for Reconsideration of the Validity of Claims 7-9 of the '276 Patent," Nov. 4, 2009.

Document No. 517158: Excerpts from "Reasoned Award," Feb. 19, 2010.

Document No. 525055: Excerpts from "Molten Metal Equipment Innovations, Inc.'s Reply Brief in Support of Application to Confirm Arbitration Award and Opposition to Motion to Vacate," May 12, 2010.

USPTO; Notice of Reissue Examination Certificate dated Aug. 27, 2001 in U.S. Appl. No. 90/005,910.

* cited by examiner

SMART MOLTEN METAL PUMP

CROSS REFERENCE TO RELATED APPLICATIONS

This application is a continuation of and claims priority to U.S. patent application Ser. No. 16/877,332 now U.S. Pat. No. 11,471,938) filed May 18, 2020 and entitled "SMART MOLTEN METAL PUMP" which claims priority to and incorporates by reference: (1) U.S. Provisional Patent Application Ser. No. 62/849,787 filed May 17, 2019 and entitled MOLTEN METAL PUMPS, COMPONENTS, SYSTEMS AND METHODS, and (2) U.S. Provisional Patent Application Ser. No. 62/852,846 filed May 24, 2019 and entitled SMART MOLTEN METAL PUMP. Each of the foregoing applications are incorporated by reference in their entirety.

BACKGROUND OF THE INVENTION

As used herein, the term "molten metal" means any metal or combination of metals in liquid form, such as aluminum, copper, iron, zinc, and alloys thereof. The term "gas" means any gas or combination of gases, including argon, nitrogen, chlorine, fluorine, Freon, and helium, which are released into molten metal.

Known molten-metal pumps include a pump base (also called a housing or casing), one or more inlets (an inlet being an opening in the housing to allow molten metal to enter a pump chamber), a pump chamber of any suitable configuration, which is an open area formed within the housing, and a discharge, which is a channel or conduit of any structure or type communicating with the pump chamber (in an axial pump the chamber and discharge may be the same structure or different areas of the same structure) leading from the pump chamber to an outlet, which is an opening formed in the exterior of the housing through which molten metal exits the casing. An impeller, also called a rotor, is mounted in the pump chamber and is connected to a drive system. The drive shaft is typically an impeller shaft connected to one end of a motor shaft, and the other end of the drive shaft is connected to an impeller. Often, the impeller (or rotor) shaft is comprised of graphite and/or ceramic, the motor shaft is comprised of steel, and the two are connected by a coupling. As the motor turns the drive shaft, the drive shaft turns the impeller and the impeller pushes molten metal out of the pump chamber, through the discharge, out of the outlet and into the molten metal bath. Most molten metal pumps are gravity fed, wherein gravity forces molten metal through the inlet and into the pump chamber as the impeller pushes molten metal out of the pump chamber. Other molten metal pumps do not include a base or support posts and are sized to fit into a structure by which molten metal is pumped. Most pumps have a metal platform, or super structure, that is either supported by a plurality of support posts attached to the pump base, or unsupported if there is no base. The motor is positioned on the superstructure if a superstructure is used.

This application incorporates by reference the portions of the following publications that are not inconsistent with this disclosure: U.S. Pat. No. 4,598,899, issued Jul. 8, 1986, to Paul V. Cooper, U.S. Pat. No. 5,203,681, issued Apr. 20, 1993, to Paul V. Cooper, U.S. Pat. No. 5,308,045, issued May 3, 1994, by Paul V. Cooper, U.S. Pat. No. 5,662,725, issued Sep. 2, 1997, by Paul V. Cooper, U.S. Pat. No. 5,678,807, issued Oct. 21, 1997, by Paul V. Cooper, U.S. Pat. No. 6,027,685, issued Feb. 22, 2000, by Paul V. Cooper, U.S. Pat. No. 6,124,523, issued Sep. 26, 2000, by Paul V. Cooper, U.S. Pat. No. 6,303,074, issued Oct. 16, 2001, by Paul V. Cooper, U.S. Pat. No. 6,689,310, issued Feb. 10, 2004, by Paul V. Cooper, U.S. Pat. No. 6,723,276, issued Apr. 20, 2004, by Paul V. Cooper, U.S. Pat. No. 7,402,276, issued Jul. 22, 2008, by Paul V. Cooper, U.S. Pat. No. 7,507,367, issued Mar. 24, 2009, by Paul V. Cooper, U.S. Pat. No. 7,906,068, issued Mar. 15, 2011, by Paul V. Cooper, U.S. Pat. No. 8,075,837, issued Dec. 13, 2011, by Paul V. Cooper, U.S. Pat. No. 8,110,141, issued Feb. 7, 2012, by Paul V. Cooper, U.S. Pat. No. 8,178,037, issued May 15, 2012, by Paul V. Cooper, U.S. Pat. No. 8,361,379, issued Jan. 29, 2013, by Paul V. Cooper, U.S. Pat. No. 8,366,993, issued Feb. 5, 2013, by Paul V. Cooper, U.S. Pat. No. 8,409,495, issued Apr. 2, 2013, by Paul V. Cooper, U.S. Pat. No. 8,440,135, issued May 15, 2013, by Paul V. Cooper, U.S. Pat. No. 8,444,911, issued May 21, 2013, by Paul V. Cooper, U.S. Pat. No. 8,475,708, issued Jul. 2, 2013, by Paul V. Cooper, U.S. patent application Ser. No. 12/895,796, filed Sep. 30, 2010, by Paul V. Cooper, U.S. patent application Ser. No. 12/877,988, filed Sep. 8, 2010, by Paul V. Cooper, U.S. patent application Ser. No. 12/853,238, filed Aug. 9, 2010, by Paul V. Cooper, U.S. patent application Ser. No. 12/880,027, filed Sep. 10, 2010, by Paul V. Cooper, U.S. patent application Ser. No. 13/752,312, filed Jan. 28, 2013, by Paul V. Cooper, U.S. patent application Ser. No. 13/756,468, filed Jan. 31, 2013, by Paul V. Cooper, U.S. patent application Ser. No. 13/791,889, filed Mar. 8, 2013, by Paul V. Cooper, U.S. patent application Ser. No. 13/791,952, filed Mar. 9, 2013, by Paul V. Cooper, U.S. patent application Ser. No. 13/841,594, filed Mar. 15, 2013, by Paul V. Cooper, and U.S. patent application Ser. No. 14/027,237, filed Sep. 15, 2013, by Paul V. Cooper, U.S. Pat. No. 8,535,603 entitled ROTARY DEGASSER AND ROTOR THEREFOR, U.S. Pat. No. 8,613,884 entitled LAUNDER TRANSFER INSERT AND SYSTEM, U.S. Pat. No. 8,714,914 entitled MOLTEN METAL PUMP FILTER, U.S. Pat. No. 8,753,563 entitled SYSTEM AND METHOD FOR DEGASSING MOLTEN METAL, U.S. Pat. No. 9,011,761 entitled LADLE WITH TRANSFER CONDUIT, U.S. Pat. No. 9,017,597 entitled TRANSFERRING MOLTEN METAL USING NON-GRAVITY ASSIST LAUNDER, U.S. Pat. No. 9,034,244 entitled GAS-TRANSFER FOOT, U.S. Pat. No. 9,080,577 entitled SHAFT AND POST TENSIONING DEVICE, U.S. Pat. No. 9,108,244 entitled IMMERSION HEATHER FOR MOLTEN METAL, U.S. Pat. No. 9,156,087 entitled MOLTEN METAL TRANSFER SYSTEM AND ROTOR, U.S. Pat. No. 9,205,490 entitled TRANSFER WELL SYSTEM AND METHOD FOR MAKING SAME, U.S. Pat. No. 9,328,615 entitled ROTARY DEGASSERS AND COMPONENTS THEREFOR, U.S. Pat. No. 9,377,028 entitled TENSIONING DEVICE EXTENDING BEYOND COMPONENT, U.S. Pat. No. 9,382,599 entitled ROTARY DEGASSER AND ROTOR THEREFOR, U.S. Pat. No. 9,383,140 entitled TRANSFERRING MOLTEN METAL FROM ONE STRUCTURE TO ANOTHER, U.S. Pat. No. 9,409,232 entitled MOLTEN METAL TRANSFER VESSEL AND METHOD OF CONSTRUCTION, U.S. Pat. No. 9,410,744 entitled VESSEL TRANSFER INSERT AND SYSTEM, U.S. Pat. No. 9,422,942 entitled TENSION DEVICE WITH INTERNAL PASSAGE, U.S. Pat. No. 9,435,343 entitled GAS-TRANSFER FOOT, U.S. Pat. No. 9,464,636 entitled TENSION DEVICE GRAPHITE COMPONENT USED IN MOLTEN METAL, U.S. Pat. No. 9,470,239 THREADED TENSIONING DEVICE, U.S. Pat. No. 9,481,035 entitled IMMERSION HEATER FOR MOLTEN METAL, U.S. Pat. No. 9,482,469 entitled VESSEL TRANSFER INSERT AND SYSTEM, U.S. Pat. No. 9,506,129 entitled ROTARY DEGASSER AND ROTOR THERE- FOR, U.S. Pat. No. 9,566,645 entitled MOLTEN METAL TRANSFER SYSTEM AND ROTOR, U.S. Pat. No. 9,581,388 entitled VESSEL TRANSFER INSERT AND SYSTEM, U.S. Pat. No. 9,587,883 entitled LADLE WITH TRANSFER CONDUIT, U.S. Pat. No. 9,643,247 entitled MOLTEN METAL TRANSFER AND DEGASSING SYSTEM, U.S. Pat. No. 9,657,578 entitled ROTARY DEGASSERS AND COMPONENTS THEREFOR, U.S. Pat. No. 9,855,600 entitled MOLTEN METAL TRANSFER SYSTEM AND ROTOR, U.S. Pat. No. 9,862,026 entitled METHOD OF FORMING TRANSFER WELL, U.S. Pat. No. 9,903,383 entitled MOLTEN METAL ROTOR WITH HARDENED TOP, U.S. Pat. No. 9,909,808 entitled SYSTEM AND METHOD FOR DEGASSING MOLTEN METAL, U.S. Pat. No. 9,925,587 entitled METHOD OF TRANSFERRING MOLTEN METAL FROM A VESSEL, entitled U.S. Pat. No. 9,982,945 MOLTEN METAL TRANSFER VESSEL AND METHOD OF CONSTRUCTION, U.S. Pat. No. 10,052,688 entitled TRANSFER PUMP LAUNDER SYSTEM, U.S. Pat. No. 10,072,891 entitled TRANSFERRING MOLTEN METAL USING NON-GRAVITY ASSIST LAUNDER, U.S. Pat. No. 10,126,058 entitled MOLTEN METAL TRANSFERRING VESSEL, U.S. Pat. No. 10,126,059 entitled CONTROLLED MOLTEN METAL FLOW FROM TRANSFER VESSEL, U.S. Pat. No. 10,138,892 entitled ROTOR AND ROTOR SHAFT FOR MOLTEN METAL, U.S. Pat. No. 10,195,664 entitled MULTI-STAGE IMPELLER FOR MOLTEN METAL, U.S. Pat. No. 10,267,314 entitled TENSIONED SUPPORT SHAFT AND OTHER MOLTEN METAL DEVICES, U.S. Pat. No. 10,274,256 entitled VESSEL TRANSFER SYSTEMS AND DEVICES, U.S. Pat. No. 10,302,361 entitled TRANSFER VESSEL FOR MOLTEN METAL PUMPING DEVICE, U.S. Pat. No. 10,309,725 entitled IMMERSION HEATER FOR MOLTEN METAL, U.S. Pat. No. 10,307,821 entitled TRANSFER PUMP LAUNDER SYSTEM, U.S. Pat. No. 10,322,451 entitled TRANSFER PUMP LAUNDER SYSTEM, U.S. Pat. No. 10,345,045 entitled VESSEL TRANSFER INSERT AND SYSTEM, U.S. Pat. No. 10,352,620 entitled TRANSFERRING MOLTEN METAL FROM ONE STRUCTURE TO ANOTHER, U.S. Pat. No. 10,428,821 entitled QUICK SUBMERGENCE MOLTEN METAL PUMP, U.S. Pat. No. 10,458,708 entitled TRANSFERRING MOLTEN METAL FROM ONE STRUCTURE TO ANOTHER, U.S. Pat. No. 10,465,688 entitled COUPLING AND ROTOR SHAFT FOR MOLTEN METAL DEVICES, U.S. Pat. No. 10,562,097 entitled MOLTEN METAL TRANSFER SYSTEM AND ROTOR, U.S. Pat. No. 10,570,745 entitled ROTARY DEGASSERS AND COMPONENTS THEREFOR, U.S. Pat. No. 10,641,279 entitled MOLTEN METAL ROTOR WITH HARDENED TIP, U.S. Pat. No. 10,641,270 entitled TENSIONED SUPPORT SHAFT AND OTHER MOLTEN METAL DEVICES, and U.S. patent application Ser. No. 16/877,267 entitled MOLTEN METAL CONTROLLED FLOW LAUNDER, U.S. patent application Ser. No. 16/877,364 entitled MOLTEN METAL TRANSFER SYSTEM AND METHOD, U.S. patent application Ser. No. 16/877,296 entitled SYSTEM AND METHOD TO FEED MOLD WITH MOLTEN METAL, U.S. patent application Ser. No. 16/877,182 (Now U.S. Pat. No. 11,358,216) entitled SYSTEM FOR MELTING SOLID METAL, and U.S. patent application Ser. No. 16/877,219 (Now U.S. Pat. No. 11,358,217) entitled METHOD FOR MELTING SOLID METAL, all of which were filed on the same date as this application.

Three basic types of pumps for pumping molten metal, such as molten aluminum, are utilized: circulation pumps, transfer pumps and gas-release pumps. Circulation pumps are used to circulate the molten metal within a bath, thereby generally equalizing the temperature of the molten metal. Circulation pumps may be used in any vessel, such as in a reverbatory furnace having an external well. The well is usually an extension of the charging well, in which scrap metal is charged (i.e., added).

Standard transfer pumps are generally used to transfer molten metal from one structure to another structure such as a ladle or another furnace. A standard transfer pump has a riser tube connected to a pump discharge and supported by the superstructure. As molten metal is pumped it is pushed up the riser tube (sometimes called a metal-transfer conduit) and out of the riser tube, which generally has an elbow at its upper end, so molten metal is released into a different vessel from which the pump is positioned.

Gas-release pumps, such as gas-injection pumps, circulate molten metal while introducing a gas into the molten metal. In the purification of molten metals, particularly aluminum, it is frequently desired to remove dissolved gases such as hydrogen, or dissolved metals, such as magnesium. As is known by those skilled in the art, the removing of dissolved gas is known as "degassing" while the removal of magnesium is known as "demagging." Gas-release pumps may be used for either of both of these purposes or for any other application for which it is desirable to introduce gas into molten metal.

Gas-release pumps generally include a gas-transfer conduit having a first end that is connected to a gas source and a second end submerged in the molten metal bath. Gas is introduced into the first end and is released from the second end into the molten metal. The gas may be released downstream of the pump chamber into either the pump discharge or a metal-transfer conduit extending from the discharge, or into a stream of molten metal exiting either the discharge or the metal-transfer conduit. Alternatively, gas may be released into the pump chamber or upstream of the pump chamber at a position where molten metal enters the pump chamber. The gas may also be released into any suitable location in a molten metal bath.

Molten metal pump casings and rotors often employ a bearing system comprising ceramic rings wherein there are one or more rings on the rotor that align with rings in the pump chamber (such as rings at the inlet and outlet) when the rotor is placed in the pump chamber. The purpose of the bearing system is to reduce damage to the soft, graphite components, particularly the rotor and pump base, during pump operation.

Generally, a degasser (also called a rotary degasser) includes (1) an impeller shaft having a first end, a second end and a passage for transferring gas, (2) an impeller, and (3) a drive source for rotating the impeller shaft and the impeller. The first end of the impeller shaft is connected to the drive source and to a gas source and the second end is connected to the impeller.

Generally, a scrap melter includes an impeller affixed to an end of a drive shaft, and a drive source attached to the other end of the drive shaft for rotating the shaft and the impeller. The movement of the impeller draws molten metal and scrap metal downward into the molten metal bath in order to melt the scrap. A circulation pump is preferably used in conjunction with the scrap melter to circulate the molten metal in order to maintain a relatively constant temperature within the molten metal.

The materials forming the components that contact the molten metal bath should remain relatively stable in the bath. Structural refractory materials, such as graphite or ceramics, that are resistant to disintegration by corrosive attack from the molten metal may be used. As used herein "ceramics" or "ceramic" refers to any oxidized metal (including silicon) or carbon-based material, excluding graphite, or other ceramic material capable of being used in the environment of a molten metal bath. "Graphite" means any type of graphite, whether or not chemically treated. Graphite is particularly suitable for being formed into pump components because it is (a) soft and relatively easy to machine, (b) not as brittle as ceramics and less prone to breakage, and (c) less expensive than ceramics.

Ceramic, however, is more resistant to corrosion by molten aluminum than graphite. It would therefore be advantageous to develop vertical members used in a molten metal device that are comprised of ceramic, but less costly than solid ceramic members, and less prone to breakage than normal ceramic.

SUMMARY OF THE INVENTION

A smart molten metal pump system and method is one that automatically controls the operating speed of the pump rather than requiring an operator to control the speed. An operator can, however, override or turn off the system and manually control the pumping if desired.

The system includes a pump, a controller for controlling the speed of the pump, and one or more of: (1) one or more thermocouples (which could be any device for measuring temperature), (2) one or more devices (referred to herein sometimes as "depth device"), such as a laser, to measure the depth of molten metal in one or more structures, and (3) one or more vibration sensors, such as an accelerometer, to measure vibration. The controller receives input (or "communications") from the thermocouple(s) about the temperature of the molten metal at one or more locations, and/or from the depth device(s) about the depth of the molten metal at one or more locations, and/or from the vibration sensor about the vibration of the pump, or of one or more pump components. The controller may also receive inputs about one or more of: the pump speed, load, length of time the pump has been operating, prior maintenance performed on the pump, and the amount of molten metal in structures, such as a launder, mold, or other vessel, adjacent or in communication with the vessel in which the pump is positioned. The controller analyzes the one or more inputs to vary the speed of the pump, to turn the pump off, and/or send messages to a human monitor or operator.

The thermocouple(s) is preferably positioned at a location under the surface of the molten metal in the vessel in which the molten metal pump is positioned. The thermocouple should not be directly exposed to the molten metal but should still accurately measure the temperature of the molten metal. The thermocouple may be positioned in a support post, pump base, rotor, or rotor shaft of the molten metal pump and housed so that it is not directly exposed to molten metal. Alternatively, the thermocouple could be positioned remote to the molten metal pump and, regardless of where it is located, communicate through a wired or wireless connection with the controller.

The device to measure the depth of the molten metal may be a laser that is positioned on a superstructure (also called a motor support or platform) of the molten metal pump, which is above the molten metal in the vessel in which the pump is positioned. Alternatively, the laser may be remote to the molten metal pump and, regardless of where it is located, communicate through a wired or wireless connection with the controller.

The vibration sensor may be an accelerometer. The vibration sensor may be positioned at any suitable location, such as in or on a support post, pump base, rotor, rotor shaft, motor shaft, superstructure, or motor of the molten metal pump. The vibration sensor should be positioned or housed so that it is not directly exposed to molten metal. The vibration sensor may communicate through a wired or wireless connection with the controller.

All the pump information can optionally be shared to a user's computer or hand-held electronic device, so the user can view it at his/her office, at home, or any remote location. The pump operational and input information can also be stored over time, for troubleshooting the pump, the vessel in which the pump operates, and/or the operational system and method used at the processing facility. In addition, software can make it possible for the pump manufacturer to remotely access the controller in order to troubleshoot or modify the pump's operation.

The controller may be positioned on the superstructure or be remote to the pump and communicate through a wired or wireless connection with the pump.

Figure 1:
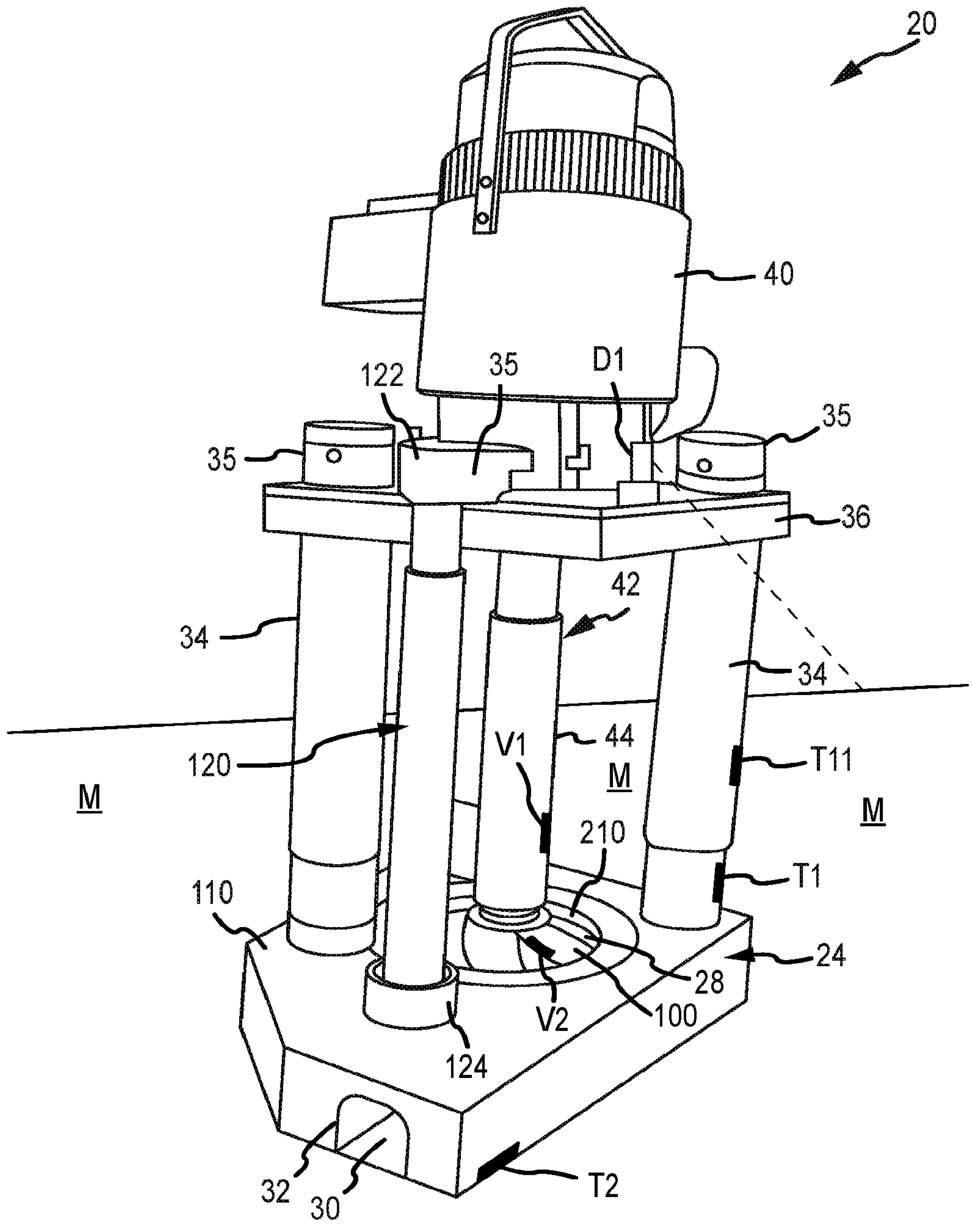
FIG. 1 is a front, perspective view of a pump for pumping molten metal according to this disclosure.

FIG. **2*a* is a top, perspective view of a pump base that may be used with the pump of FIG. 1**.

Figure 3:
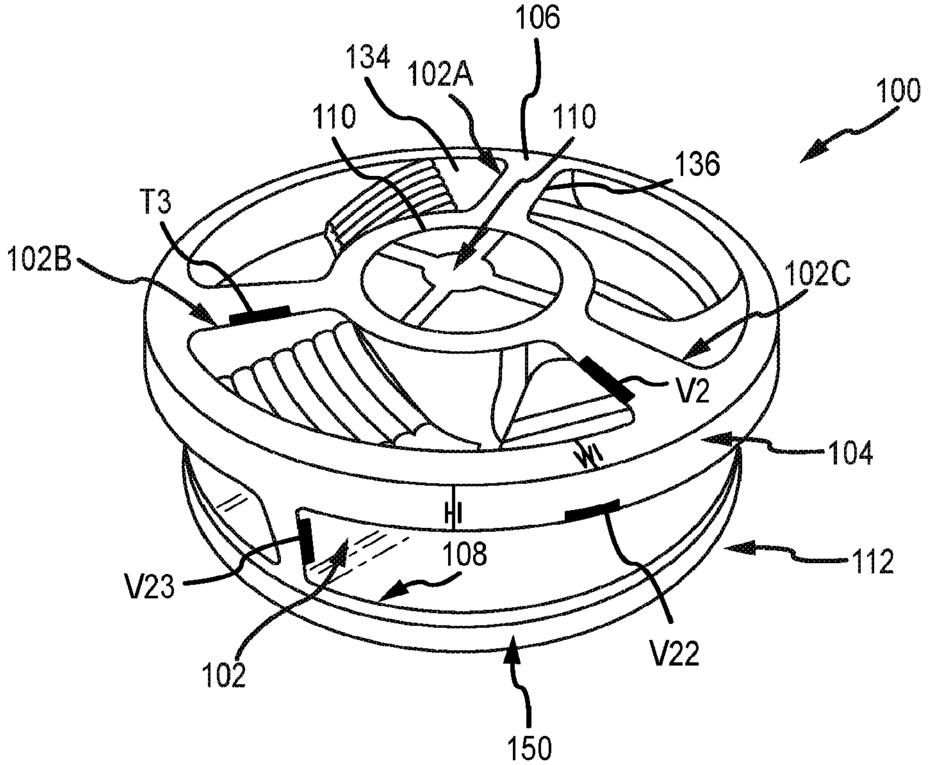

FIG. 3 is a top, perspective view of a rotor according to this disclosure.

Figure 4:
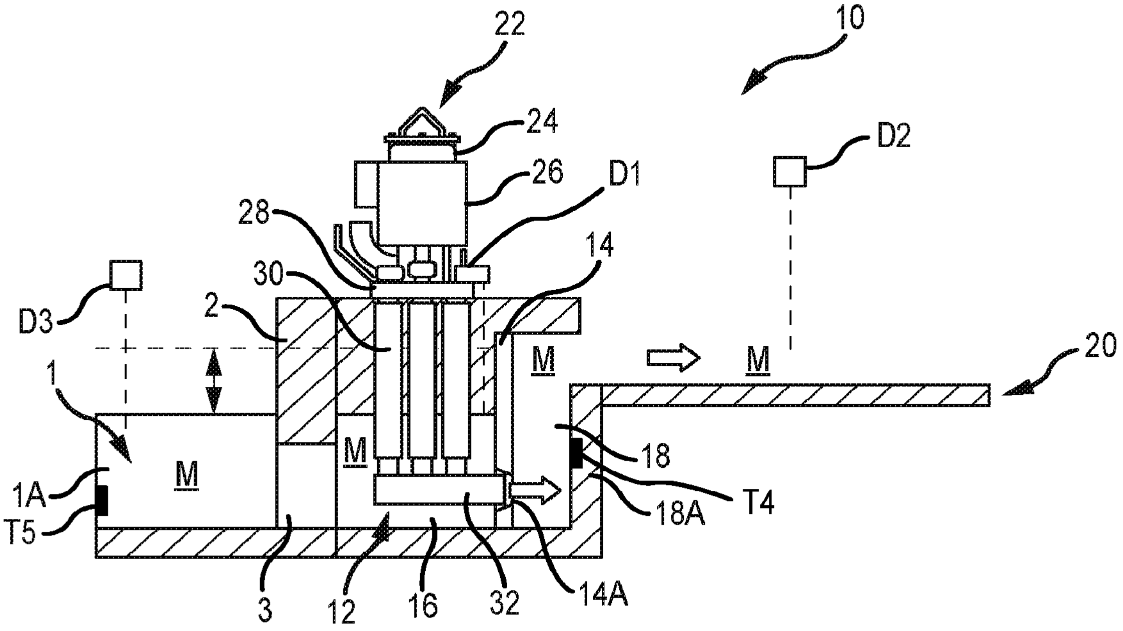

FIG. 4 is a cross-sectional side view of an exemplary system according to this disclosure.

Figure 5:
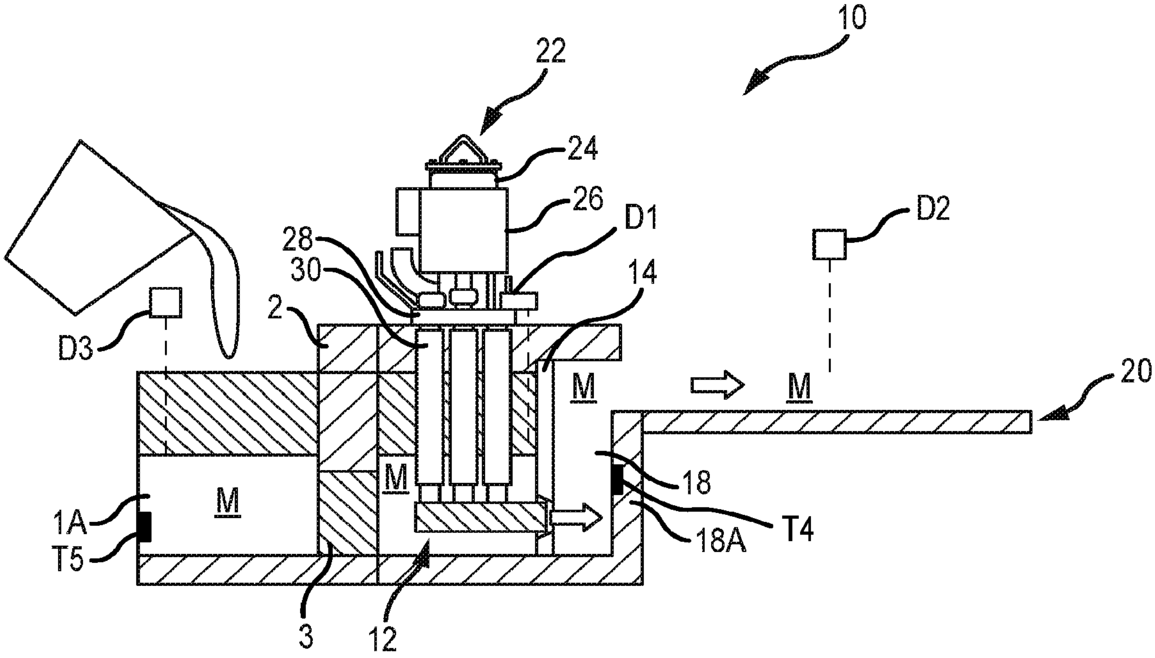

FIG. 5 is the system of FIG. 4 showing the level of molten metal in the furnace being increased.

Figure 6:
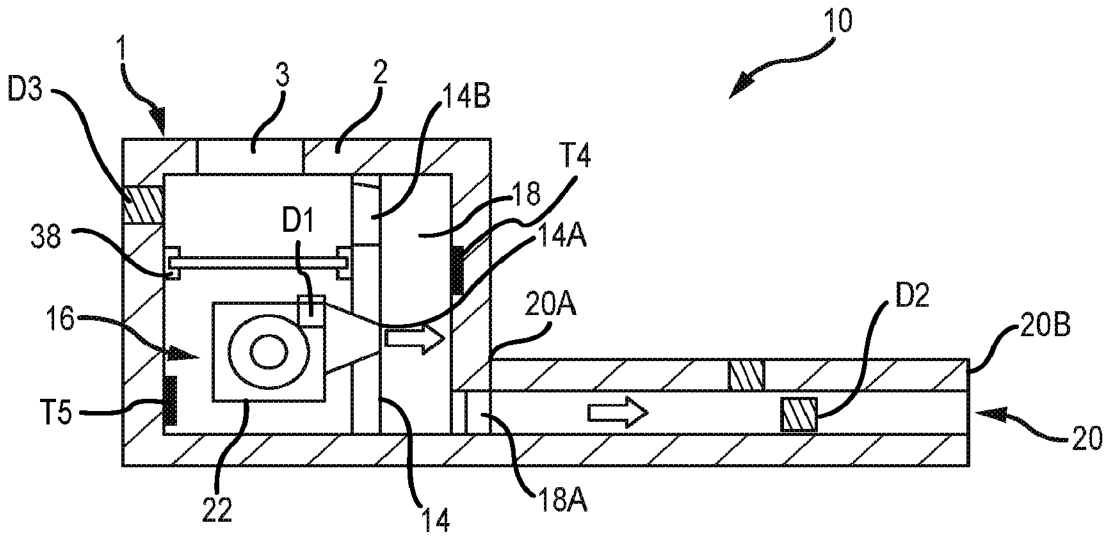

FIG. 6 is a top view of the system of FIG. 4.

Figure 7:
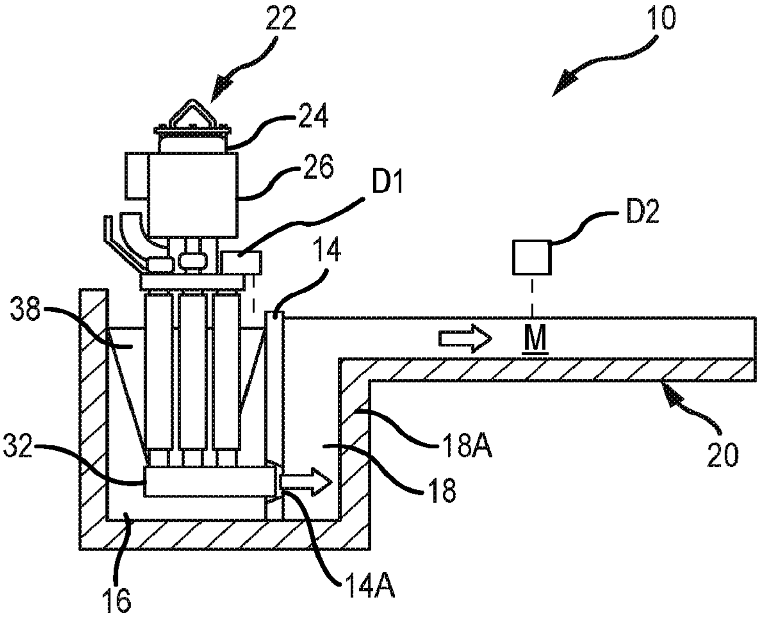

FIG. 7 is a partial, cross-sectional side view of an exemplary system according to this disclosure.

Figure 8:
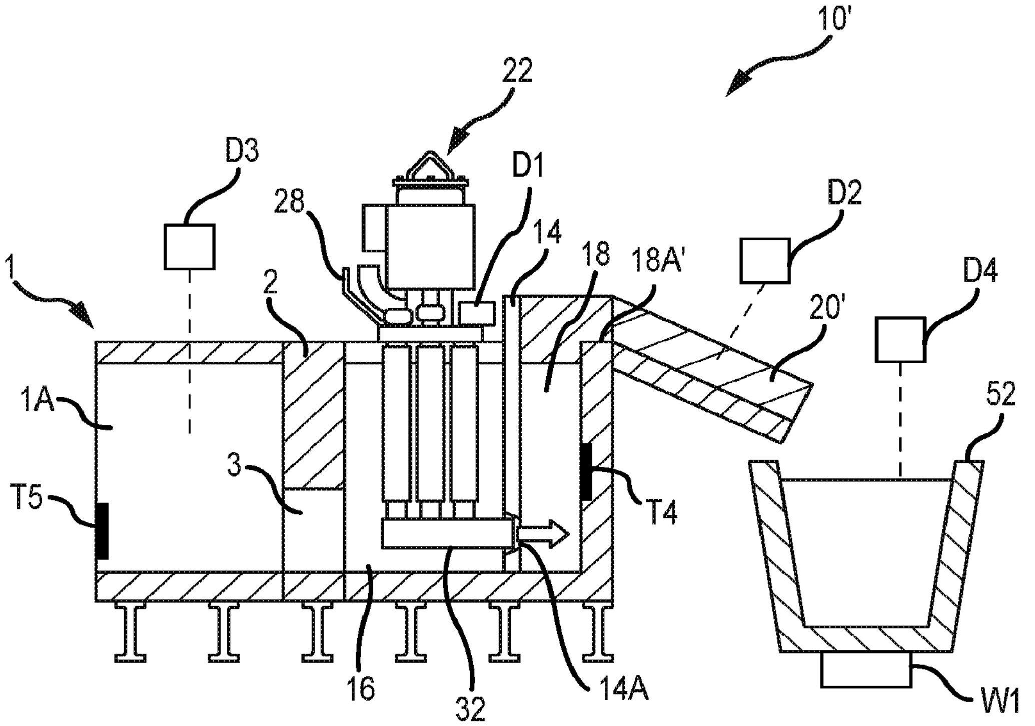

FIG. 8 is a partial, cross-sectional side view of an exemplary system according to this disclosure.

Figure 9:
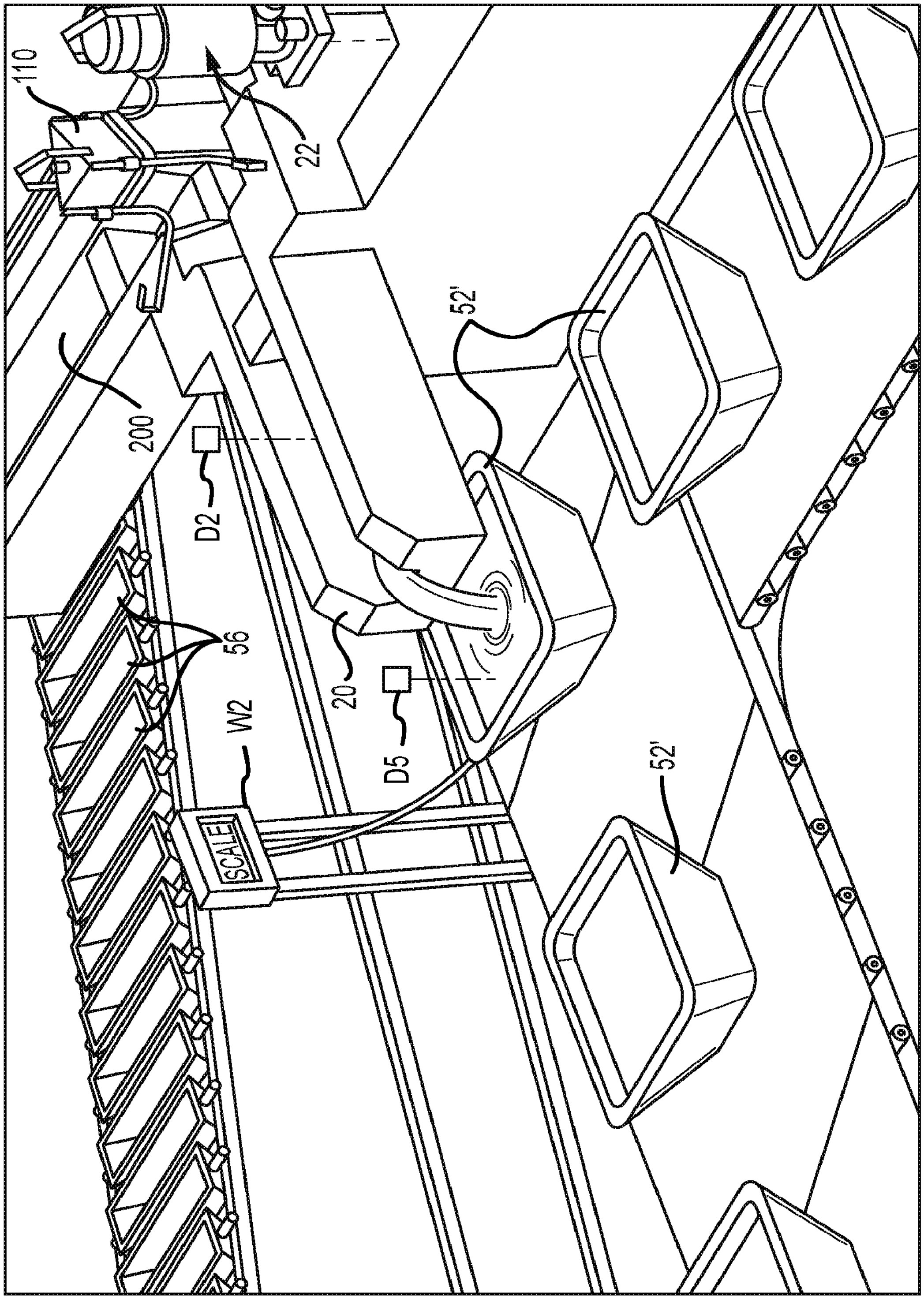

FIG. 9 is a front, partial perspective view of an exemplary system according to this disclosure.

Figure 10:
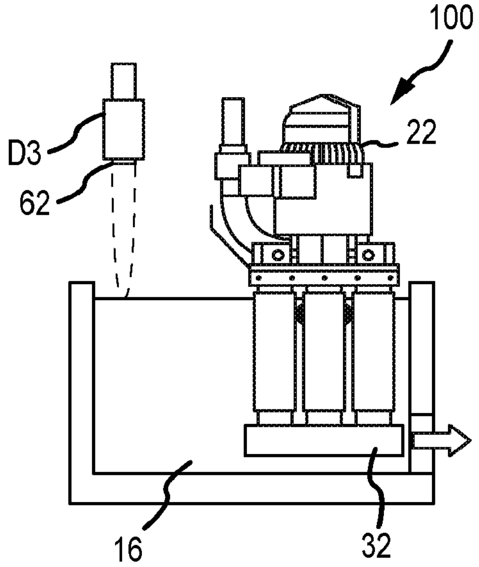

FIG. 10 is schematic representation of an exemplary system according to this disclosure.

Figure 11:
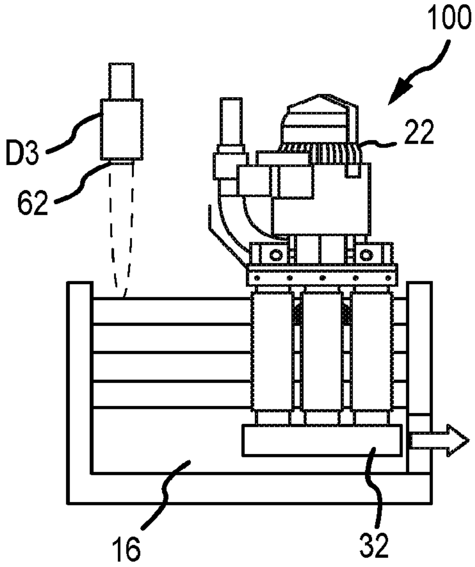

FIG. 11 shows the system of FIG. 10 and represents different levels of molten metal in the vessel.

Figure 12:
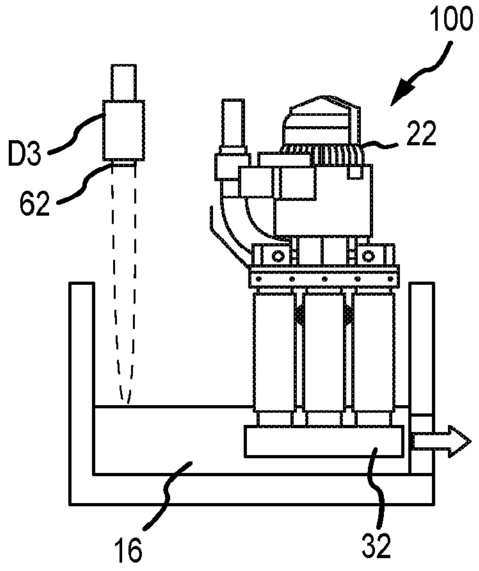

FIG. 12 shows the system of FIG. 10 in which the level of molten metal has decreased to a minimum level.

Figure 13:
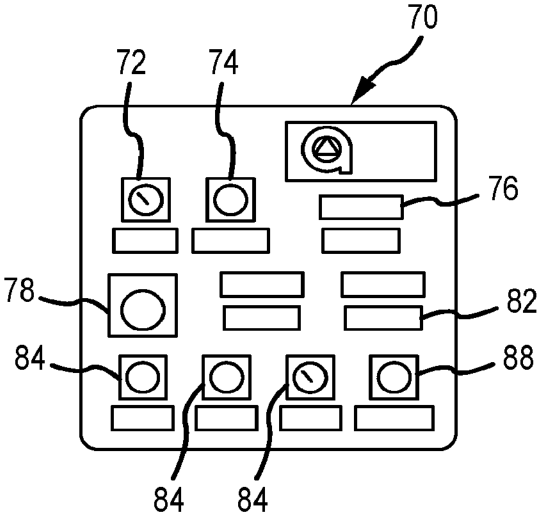

FIG. 13 shows a controller panel that may be used to control a pump used in a system according to this disclosure.

DETAILED DESCRIPTION

Turning now to the figures, wherein the purpose is to describe an embodiment of this disclosure and not to limit same, a smart molten metal pump system 10 can include a molten metal circulation pump, gas-injection (or gas-release) pump, or transfer pump. Currently, most molten metal pumps use a variable frequency drive ("VFD") to control the speed of the pump. An operator controls the pump speed based on observing various operating parameters.

A smart pump system 10 as disclosed uses a program logic controller ("PLC" or "controller") 170 and human machine interface ("HMI") for additional functionality and feedback. It optionally utilizes SCADA (supervisory control and data acquisition) hardware/software with a GE IFIX 75 tag for remote monitoring of the pump 22, such as from an office at an aluminum processing facility.

A computer 500 for accessing and monitoring data received by the controller 170, and/or controlling the pump 22, may be located at an operator's location, such as at an office at the processing facility. The controller 170 may also be accessible by a hand-held device 510 such as a cellular phone. Further, the controller 170 may also be accessible by a computer 520 at the pump manufacturer's facility. Any suitable wired or wireless connection between a computer 500, hand-held device 510, manufacturer's computer 520, and the controller, such as an Ethernet connection, may be utilized. The pump's operational and input information can also be stored over time for troubleshooting: the pump 22, the vessel in which the pump 22 operates, other vessels, and/or the operational system and method used at the processing facility in which the pump 22 is located.

The measured inputs (or "inputs") to the controller 170 are one or more of: (1) the molten metal temperature in one or more vessels (such as the furnace pump well, a launder and/or a ladle); (2) the depth (or level) of the molten metal in one or more of the afore-mentioned vessels, which could be measured in any suitable manner, such as by a laser measuring device or float; (3) the vibration of the pump 22, or of a pump component (such as the drive shaft 42 or rotor 100), by a vibration sensor at any suitable location on the pump; (4) the weight of molten metal in a structure, such as a mold or ladle; and (5) pump speed, pump load, and other information. The controller 170 may also include the date the pump 22 was installed and maintenance history for the pump 22.

The controller 170 may control the speed of the pump 22, turn the pump 22 on, turn the pump 22 off, and/or send a signal to an operator, based on one or more of the measured inputs. For example, if shaft 42 breaks, a vibration sensor would detect it and turn the pump 22 off. The controller 170 can also be programmed to develop a relationship between two or more of the inputs, e.g., two or more of: temperature of the molten metal, level of the molten metal, vibration, speed of the pump, and pump load.

When a furnace or other vessel is charging (which means adding solid aluminum to the molten metal in a vessel), or when the molten metal temperature is relatively low or dropping in a vessel, the pump 22 should generally run faster to increase the solid metal melt rate and/or molten metal mixing rate. The pump 22 can be slowed when the measured temperature is proper and/or a vessel is not being charged with solid aluminum. Utilizing a slower speed when a higher speed is not necessary increases the life of pump components such as the rotor shaft 42 and rotor 100.

Some benefits of the teachings of this disclosure are one or more of: (1) increased production from an existing molten metal processing vessel; (2) increased solid metal melting efficiency; (3) more uniform temperature distribution in a vessel; (4) longer component life for the pump; and (5) less time required of a human operator.

Thermocouples in the drawings are designated by the letter "T" followed by a numeral. Vibration sensors are designated by the letter "V" followed by a numeral. Molten metal level detectors are designated by the letter "D" followed by a numeral. Scales are designated by the letter "W" followed by a numeral.

Referring now to the drawings where the purpose is to illustrate and describe non-limiting embodiments of this disclosure, FIG. 1 shows system 10 having a molten metal pump 22 that includes a rotor (also called an "impeller") 100. Pump 22 may be positioned in molten metal M in a pump well, which may be part of the open well of a reverberatory furnace.

Exemplary Molten Metal Pump

The components of exemplary pump 22, including rotor 100, that are exposed to the molten metal are preferably formed of structural refractory materials, which are resistant to degradation in the molten metal. Pump 22 can be any structure or device for pumping or otherwise conveying molten metal, and may be an axial pump having an axial, rather than tangential, discharge.

Molten metal pump 22 can be a constant speed pump but is most preferably a variable speed pump. Its speed can be varied depending on any of one or more of the amount or temperature, of molten metal in a structure, such as a furnace, ladle or launder, or whether solid metal scrap must be melted, or the pump vibration, or of other inputs to controller 170.

Preferred pump 22 has a pump base (also called a "casing" or "housing") 24 for being submersed in a molten metal bath. Pump base 24 preferably includes a generally nonvolute pump chamber 26, such as a cylindrical pump chamber or what has been called a "cut" volute, although pump base 24 may have any suitable shape pump chamber, including a volute-shaped pump chamber. Pump chamber 26 may be constructed to have only one opening, either in its top or bottom, if a tangential discharge is used, since only one opening is required to introduce molten metal to enter pump chamber 26. Generally, pump chamber 26 has two coaxial openings of the same diameter and usually one is blocked by a flow blocking plate mounted on the bottom of, or formed as part of, rotor 100. As shown, pump chamber 26 includes a top opening 28, bottom opening 29, and wall 31.

Base 24, in this embodiment, further includes a tangential discharge 30 in fluid communication with pump chamber 26. A preferred base 24 has sides 112, 114, 116, 118 and 120 and a top surface 110. The invention is not limited to any particular type or configuration of base, however. A pump base used with the invention could be of any suitable size, design or configuration. The top portion of wall 31 is machined to receive a bearing surface, which (in this Figure) is not yet mounted to wall 31. The bearing surface is typically comprised of ceramic and cemented to wall 31.

One or more support post receiving bores 126 are formed in base 24 and are for receiving support posts 34.

Figure 2:
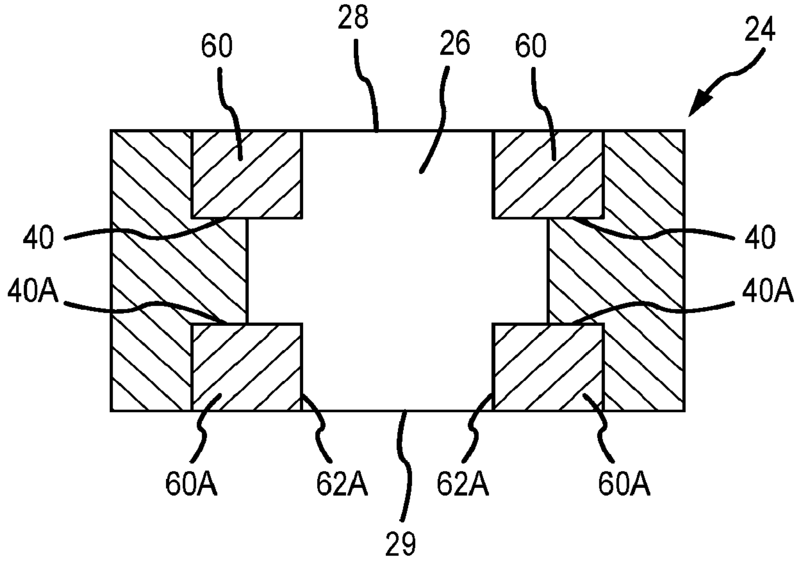
FIG. 2 is a partial, cross-sectional view of a pump base that may be used with the pump of FIG. 1.
Figure 2A:
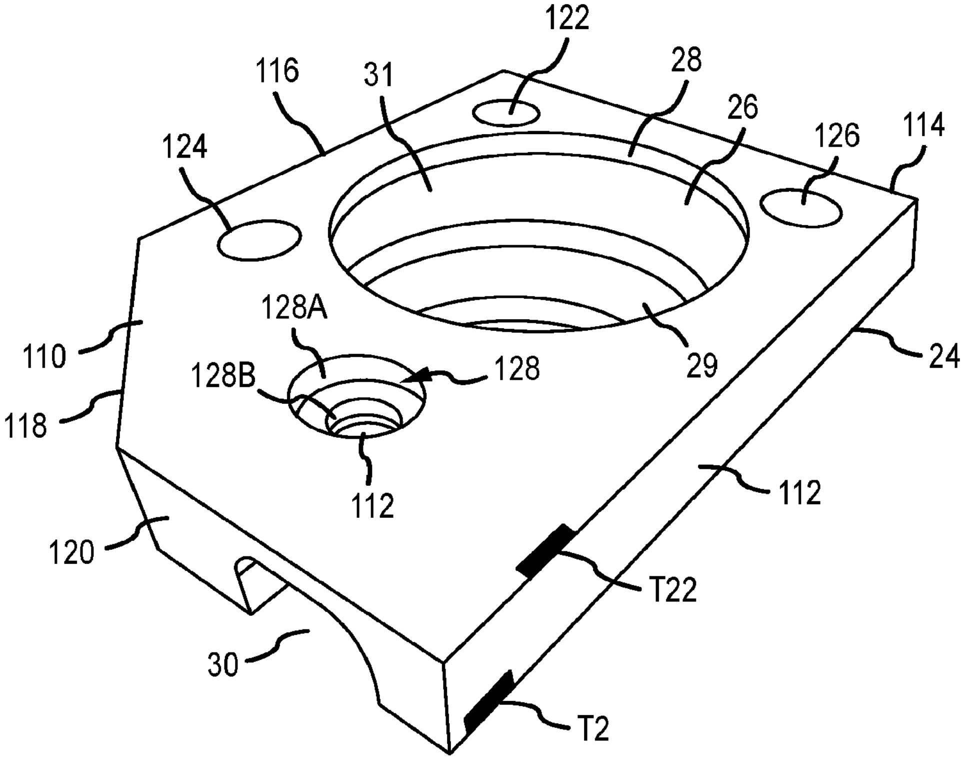

As shown in FIG. 2, pump base 24 can have a stepped surface 40 defined at the periphery of pump chamber 26 at inlet 28 and a stepped surface 40A defined at the periphery of inlet 29. Stepped surface 40 preferably receives a bearing ring member 60 and stepped surface 40A preferably received a bearing ring member 60A. Each bearing member 60, 60A is preferably comprised of silicon carbide, although any suitable material may be used. The outer diameter of members 60, 60A varies with the size of the pump, as will be understood by those skilled in the art. Bearing members 60, 60A each has a preferred thickness of 1". Preferably, bearing ring member 60 is provided at inlet 28 and bearing ring member 60A is provided at inlet 29, respectively, of pump base 24. Alternatively, bearing ring members 60, 60A need not be used. In the preferred embodiment, bottom bearing ring member 60A includes an inner perimeter, or first bearing surface, 62A, that aligns with a second bearing surface and guides rotor 100 as described herein. It is most preferred that a bearing surface with one or more grooves, such as the surface on bearing member 150 described herein be utilized. Additionally, rotor 100 may include a bearing ring, bearing pin or bearing members, such as the ones disclosed in U.S. Pat. No. 6,093,000 to Cooper One or more support posts 34 connect pump base 24 to a superstructure 36 of pump 22 thus connecting superstructure 36 to pump base 24. In a preferred embodiment, post clamps 35 secure support posts 34 to superstructure 36. Any suitable structure or structures capable of connecting superstructure 36 to pump base 24 may be used. Additionally, pump 22 could be constructed so there is no physical connection between the base and the superstructure. The motor, drive shaft and rotor could be suspended without a superstructure, and there need not be a pump base.

A motor 40, which can be any structure, system or device suitable for driving pump 22, but is preferably an electric or pneumatic motor, is positioned on superstructure 36 and is connected to a first end of a drive shaft 42. Motor 40 preferably is at least partially surrounded by a cooling shroud 41. Some pumps that may be used with the invention are shown in U.S. Pat. Nos. 5,203,681, 6,123,523, and 6,354,964 to Cooper.

A drive shaft 42 can be any structure suitable for connecting motor 40 to rotor 100, and for rotating rotor 100. Drive shaft 42 preferably comprises a motor shaft 42A coupled by a coupling 43 to a rotor shaft 44. The motor shaft 42A has a first end and a second end, wherein the first end of the motor shaft 42A is connected to motor 40 and the second end of the motor shaft 42A is connected to coupling 43. Rotor shaft 44 has a first end 44A and a second end 44B, wherein the first end 44A is connected to the coupling 43 and the second end 44B is connected to rotor 100.

One preferred rotor 100 is sized to fit through both openings 28 and 29, although it could be of any suitable shape or size suitable to be used in a molten metal pump. The preferred dimensions of rotor 100 will depend upon the size of pump 22 because the size of a rotor invention varies with the size of the pump and on manufacturer's specifications. Rotor 100 can be comprised of a single material, such as graphite or ceramic, or can be comprised of different materials. For example, inlet structure 104 may be comprised of ceramic and the displacement structure 102 may be comprised of graphite, or vice versa. Any part or all of rotor 100 may also include a protective coating.

As rotor 100 is rotated by drive shaft 42, displacement structure 102 and inlet structure 104 rotate. Thus, in the preferred embodiment, rotor blades 102A, 102B and 102C and inlets 106A, 106B and 106C rotate as a unit.

Exemplary System

Turning to FIGS. 4-8, an exemplary smart pump system 10' for moving molten metal M onto a raised structure 20, such as a launder, as shown. This exemplary system 10' includes a furnace 1 that can retain molten metal M, which in this embodiment includes a holding furnace 1A, a vessel 12, raised structure 20, and pump 22. Vessel 12 is divided by a dividing wall 14 to separate vessel 12 into at least a first chamber 16 and a second chamber 18. Pump 22 generates a stream of molten metal from first chamber 16 into second chamber 18. In system 10', pump 22 is preferably a circulation pump (most preferred) or gas-release pump that generates a flow of molten metal from first chamber 16 to second chamber 18 through an opening 14A.

Using heating elements (not shown in the figures), furnace 1 is raised to a temperature sufficient to maintain the metal therein (usually aluminum or zinc) in a molten state. The level of molten metal M in holding furnace 1A and in at least part of vessel 12 changes as metal is added or removed to furnace 1A, as can be seen in FIG. 2.

For explanation, furnace 1 includes a furnace wall 2 having an archway 3. Archway 3 allows molten metal M to flow into vessel 12 from holding furnace 1A. In this embodiment, furnace 1A and vessel 12 are in fluid communication, so when the level of molten metal in furnace 1A rises, the level of molten metal also rises in at least part of vessel 12. It most preferably rises and falls in first chamber 16, described below, as the level of molten metal rises or falls in furnace 1A. This can be seen in FIG. 5.

As previously mentioned, dividing wall 14 separates vessel 12 into at least two chambers, a pump well (or first chamber) 16 and a skim well (or second chamber) 18, and any suitable structure for this purpose may be used as dividing wall 14. As shown in this embodiment, dividing wall 14 has planar sides, a top edge, an opening 14A, and an optional overflow spillway 14B (best seen in FIG. 6), which is a notch or cut out in the upper edge of dividing wall 14. Overflow spillway 14B is any structure suitable to allow molten metal to flow from second chamber 18, past dividing wall 14, and into first chamber 16 and, if used, overflow spillway 14B may be positioned at any suitable location on wall 14. The purpose of optional overflow spillway 14B is to prevent molten metal from overflowing the second chamber 18, or a launder 20 in communication with second chamber 18 (if a launder is used with the invention), by allowing molten metal in second chamber 18 to flow back into first chamber 16. Optional overflow spillway 14B would not be utilized during normal operation of system 10 and is to be used as a safeguard if the level of molten metal in second chamber 18 improperly rises to too high a level.

In the embodiment shown in FIGS. 4-8, overflow spillway 14B has a height H1 and the rest of dividing wall 14 has a height greater than H1. Alternatively, dividing wall 14 may not have an overflow spillway, in which case all of dividing wall 14 could have a height H1, or dividing wall 14 may have an opening with a lower edge positioned at height H1, in which case molten metal could flow through the opening if the level of molten metal in second chamber 18 exceeded H1. H1 should exceed the highest level of molten metal in first chamber 16 during normal operation.

Second chamber 18 has a portion 18A, which has a height H2, wherein H2 is less than H1 (as can be best seen in FIG. 7) so during normal operation molten metal pumped into second chamber 18 flows past wall 18A and out of second chamber 18 rather than flowing back over dividing wall 14 and into first chamber 16.

Dividing wall 14 may also have an opening 14A that is located at a depth such that opening 14A is submerged within the molten metal during normal usage. Opening 14A preferably has an area of between 6 $in.^2$ and 24 $in.^2$ but could be any suitable size. The opening 14A is preferably entirely below the level that is 50% of the height, or 40% of the height, or 30% of the height, or 20% of the height, of dividing wall 14. Further, dividing wall 14 need not have an opening if a transfer pump were used to transfer molten metal from first chamber 16, over the top of wall 14, and into second chamber 18 as described below.

Dividing wall 14 may also include more than one opening between first chamber 16 and second chamber 18, and opening 14A (or the more than one opening) could be positioned at any suitable location(s) in dividing wall 14 and be of any size(s) or shape(s) to enable molten metal to pass from first chamber 16 into second chamber 18.

Utilizing system 10, as pump 22 pumps molten metal from first chamber 16 into second chamber 18, the level of molten metal in chamber 18 rises.

A system according to this disclosure could also include one or more pumps in addition to pump 22, in which case the additional pump(s) may circulate molten metal within first chamber 16 and/or second chamber 18, or from chamber 16 to chamber 18, and/or may release gas into the molten metal first in first chamber 16 or second chamber 18. For example, first chamber 16 could include pump 22 and a second pump, such as a circulation pump or gas-release pump, to circulate and/or release gas into molten metal M.

If pump 22 is a circulation pump or gas-release pump, it may include a snout on the pump base that is at least partially received in opening 14A in order to help maintain a relatively stable level of molten metal in second chamber 18 during normal operation and to allow the level in second chamber 18 to rise independently of the level in first chamber 16. The snout could be connected in opening 14A to form a tight seal.

As shown in FIGS. 4-8, raised structure 20 in this embodiment is a launder. If raised structure 20 is a launder, it may be either an open or enclosed channel, trough or conduit, and may be of any suitable dimension or length, such as one to four feet long, or as much as 100 feet long or longer. The launder may be completely horizontal or may slope gently upward or downward. The launder may have one or more taps (not shown), i.e., small openings stopped by removable plugs. Each tap, when unstopped, allows molten metal to flow through the tap into a ladle, ingot mold, or other structure. The launder may additionally or alternatively be serviced by robots or cast machines capable of removing molten metal M from the launder.

In this embodiment, launder 20 has a first end 20A and a second end 20B. An optional stop may be included in a launder 20 juxtaposed the second end 20B. If launder 20 has a stop, the stop can be opened to allow molten metal to flow past end 20B or closed to help prevent molten metal from flowing past end 20B.

FIG. 8 shows an alternate system 10' that is in all respects the same as system 10 except that it has a shorter, downward, sloping launder 20', wall 18A' past which molten metal moves when it exits second chamber 18, and it fills a ladle 52.

Exemplary Smart Pump/System Features

An exemplary smart pump system 10 or 10' according to this disclosure includes pump 22, and a controller 170 for controlling the speed of the pump, and further includes one or more of: (1) one or more thermocouples (which could be any device for measuring temperature) to measure molten metal temperature at one or more locations; (2) one or more devices (referred to herein sometimes as a "depth device"), such as a laser or float, to measure the depth (or level) of molten metal in one or more structures; and (3) one or more vibration sensors, such as an accelerometer(s), to measure vibration of the pump and/or one or more pump components, such as the rotor 100 and/or rotor shaft 44. The controller 170 receives a measured input (or "input" or "communication") from one or more of: (a) the thermocouple(s) about the temperature of the molten metal at one or more locations; (b) the depth device(s) about the depth (or level) of the molten metal at one or more locations; and (c) the vibration sensor(s) about the vibration of the pump, and/or of one or more pump components. The controller may also receive input about one or more of: the pump speed, pump load, the length of time the pump has been operating, prior maintenance performed on the pump, and the weight of molten metal in structures, such as a launder, mold, or other vessel. The controller can analyze the one or more inputs to turn the pump on, to vary the speed of the pump, to turn the pump off, and/or send messages to an operator.

The thermocouple(s) is preferably configured to be positioned at a location in which it is under the surface of the molten metal when the molten metal pump is operating. The thermocouple may be positioned in a support post, pump base, rotor, or rotor shaft of the molten metal pump and housed so that it is not directly exposed to molten metal. As shown in the example in the Figures, there is a thermocouple T1 mounted in a support post 34, a thermocouple T2 mounted in base 24, a thermocouple T3 mounted in rotor 100, a thermocouple T4 positioned in second chamber 18, a thermocouple T5 positioned in vessel 1, and a thermocouple T6 positioned in a side wall of launder 20. Controller 170 may receive input from one or more of these thermocouples, and/or from one or more other thermocouples positioned at different locations.

The system 10 may also include one or more depth devices. As shown in the example, there is a depth device D1 on the pump superstructure 36 that measures the depth (or level) of molten metal in the vessel (which for D1 is the level of molten metal in first chamber 16) in which molten metal pump 22 is positioned. A depth device D2 is positioned above launder 20 and may be mounted on a side wall of launder 20 and measures the level of molten metal in the launder 20. A depth device D3 is positioned above vessel 1 and may be mounted on a side wall of vessel 1 and measures the level of molten metal in vessel 1. A depth device D4 is above ladle 52 and measures the level of molten metal in ladle 52. Controller 170 may receive input from one or more of the depth devices, and/or from other depth devices positioned at different locations.

The system 10 may also include one or more vibration sensors. A vibration sensor, which may be an accelerometer, V1 is shown in this example as being positioned on drive shaft 44. A vibration sensor V2 is shown as being positioned in rotor 100. Controller 170 may receive input from one or more of the vibration sensors, and/or from other vibration sensor(s) positioned at different locations.

The system may also include one or more weight sensors, which may be scales, to measure the weight of molten metal in one or more structures. In the example shown, there is a weight sensor W1 that measures the weight of molten metal in ladle 52. A weight sensor W2 measures the weight of molten metal in molds 52' on a fill line. Controller 170 may receive input from one or more of the weight sensor(s), and/or from weight sensor(s) positioned at different locations.

All the pump information can optionally be shared to a user's computer 500 or hand-held electronic device 510, so the user can view it at his/her office, at home, or any remote location. The pump operational and input information can also be stored over time, for troubleshooting the pump, the vessel in which the pump operates, and/or the operational system and method used at the processing facility. In addition, software can make it possible for a computer 520 at the pump manufacturer to remotely access the controller 170 in order to troubleshoot or modify the operation of pump 22.

Exemplary Controller

FIGS. 10-13 show a controller, 170 which could function with any system according to this disclosure. The controller

170 may be positioned on the superstructure 36 or be remote to the pump 22 and communicate through a wired or wireless connection with the pump and sensors described herein.

The controller 170 may vary the speed of, and/or turn off and on, molten metal pump 22, or send a message to an operator, in accordance with any of the inputs. For example, if the input was the amount of molten metal in a ladle (as measured by any device, such as a scale or laser), when the amount of molten metal M within the ladle is low, the controller 170 could cause the speed of molten metal pump 22 to increase to pump molten metal M at a greater flow rate to fill the ladle. As the level of the molten metal within the ladle increased, the controller could cause the speed of molten metal pump 22 to decrease and to pump molten metal M at a lesser flow rate, thereby decreasing the flow of molten metal into the ladle. The controller 170 could be used to stop the operation of molten metal pump 22 should the amount of the molten metal within a structure, such as a ladle, reach a given value or if a problem were detected. The control system could also start pump 22 based on a given input.

The controller may provide proportional control, such that the speed of molten metal pump 22 is proportional, or varied, according to one or more of: (1) the amount (or level) of molten metal within one or more vessels; (2) the temperature of molten metal within one or more vessels; (3) the amount of solid aluminum being added to one or more vessels; (4) the weight of molten metal in one or more vessels; (5) the vibration of the pump of one or more pump components, (6) the pump speed; and (7) the pump load. The controller could be customized to provide a smooth, even flow of molten metal to one or more structures such as one or more ladles or ingot molds with minimal turbulence and little chance of overflow.

FIG. 13 shows a control panel 70 that may be used with a controller. Controller 170 includes an "auto/man" (also called an auto/manual) control 172 that can be used to choose between automatic and manual control. A "device on" button 174 allows a user to turn any sensors or inputs on and off. An optional "metal depth" indicator 176 allows an operator to determine the depth of the molten metal as measured by the depth devices. An emergency on/off button 178 allows an operator to stop metal pump 22. An optional RPM indicator 180 allows an operator to determine the number of revolutions per minute of rotor 100 of molten metal pump 22. An AMPS indicator 182 allows the operator to determine an electric current to the motor of molten metal pump 22. A start button 184 allows an operator user to start molten metal pump 22, and a stop button 185 allows a user to stop molten metal pump 22.

A speed control 186 can override the automatic controller 170 (if being utilized) and allows an operator to increase or decrease the speed of the molten metal pump 22. A cooling air button 190 allows an operator to direct cooling air to the pump motor.

Some non-limiting examples of this disclosure are as follow:

Example 1: A molten metal pump system comprising:

a controller for controlling the speed of the pump;

a thermocouple positioned in one of the base, support post, rotor, or rotor shaft, wherein the thermocouple is configured to measure the temperature of molten metal in which the pump is positioned and communicate the temperature to the controller;

a laser mounted on the superstructure, the laser configured to measure the depth of molten metal in the vessel and to communicate the depth to the controller;

wherein the controller varies the speed of the pump based on the temperature of the molten metal and the depth of the molten metal in the vessel.

Example 2: The molten metal pump system of example 1 that comprises a circulation pump.

Example 3: The molten metal pump system of example 1 that comprises a gas-release pump.

Example 4: The molten metal pump system of example 1 that comprises a gas-release pump that releases gas directly into the pump chamber.

Example 5: The molten metal pump system of example 1 that comprises a transfer pump.

Example 6: The molten metal pump system of example 1 that comprises a transfer pump that has a riser tube comprising a first end connected to the pump base and a second end connected to a launder.

Example 7: The molten metal pump system of example 1 that further comprises a vibration sensor on one or more of the rotor shaft, the superstructure, and the rotor, wherein the vibration sensor is configured to detect vibration and communicate the vibration to the controller.

Example 8: The molten metal pump system of example 7, wherein the controller is programmed with a maximum vibration level and the controller is configured to turn off the molten metal pump system if the maximum vibration level is exceeded.

Example 9: The molten metal pump system of any of examples 1-8, wherein the controller is remote to the pump.

Example 10: The molten metal pump system of any of examples 1-8, wherein the controller is on a superstructure of the pump.

Example 11: The molten metal pump system of any of examples 1-10, wherein the thermocouple is in an enclosed box that is configured to be positioned beneath the molten metal when the molten metal pump system is positioned in a molten metal bath, so the thermocouple does not contact the molten metal.

Example 12: The molten metal pump system of any of examples 1-11, wherein there is an insulating material between the superstructure and the laser.

Example 13: The molten metal pump system of any of examples 1-12, wherein the thermocouple is positioned in the vessel and is remote from the pump.

Example 14: The molten metal pump system of any of examples 1-13, wherein the communication from the thermocouple to the controller is wireless.

Example 15: The molten metal pump system of any of examples 1-14, wherein the communication from the laser to the controller is wireless.

Example 16: The molten metal pump system of example 7, wherein the communication from the vibration sensor to the controller is wireless.

Example 17: The molten metal pump system of example 1 that further comprises a display that shows one or more of: a measured temperature of the molten metal, a measured depth of the molten metal, a vibration level of the molten metal pump, a load on the pump, and a speed of the molten metal pump.

Example 18: The molten metal pump system of any of examples 1-17, wherein the controller comprises a memory that stores an operational history of the molten metal pump.

Example 19: The molten metal pump system of any of examples 1-18, wherein the controller can be accessed from a remote location.

Example 20: The molten metal pump system of example 19, wherein the controller can be re-programmed from the remote location.

Example 21: The molten metal pump system of example 7 or 16, wherein the vibration sensor is an accelerometer.

Example 22: The molten metal pump system of any of examples 1-21, wherein there is an insulating material configured to be between the superstructure and a molten metal bath when the molten metal pump is in a molten metal bath.

Example 23: The molten metal pump system of any of examples 1-22, wherein the controller: varies the speed of the pump, turns off the pump, and/or sends a message to a monitor or operator, based on (a) the temperature of the molten metal, (b) the depth of the molten metal, and/or (c) the vibration of the pump.

Example 24: The molten metal pump system of any of examples 1-23, wherein the controller is further configured to receive one or more of the pump speed and pump load and wherein the controller: varies the speed of the pump, turns off the pump, and/or sends a message to a monitor or operator, based on (a) the temperature of the molten metal, (b) the depth of the molten metal measured, (c) the speed of the pump, and/or (d) the pump load.

Example 25: The molten metal pump system of any of examples 1-24 that further comprises a second thermocouple in the vessel and remote to the pump, the second thermocouple being in communication with the controller.

Example 26: The molten metal pump system of any of examples 1-25 that further comprises a second depth device mounted and configured so as to measure the depth of molten metal in a second vessel, the second depth device being in communication with the controller.

Example 27: The molten metal pump system of any of examples 1-26 that further comprises a scale that measures the weight of molten metal in a structure and communicates the weight to the controller.

Example 28: The molten metal pump system of any of examples 1-27 that further comprises a second vibration sensor on or in a pump structure that does not include the vibration sensor.

Example 29: The molten metal pump system of example 26, wherein the second vessel is a ladle, a launder, a mold, or a reverberatory furnace.

Example 30: The molten metal pump system of example 27, wherein the structure is a ladle or a mold.

Example 31: The molten metal pump system of example 28, wherein the vibration sensor is on the pump shaft and the second vibration sensor is in the rotor.

Having thus described different embodiments of the invention, other variations and embodiments that do not depart from the spirit thereof will become apparent to those skilled in the art. The scope of the present invention is thus not limited to any particular embodiment, but is instead set forth in the appended claims and the legal equivalents thereof. Unless expressly stated in the written description or claims, the steps of any method recited in the claims may be performed in any order capable of yielding the desired product or result.

What is claimed is:

1. A molten metal pump system comprising:

(a) a molten metal pump having a plurality of pump structures that include: a rotor shaft, a motor shaft, a motor, a superstructure, a rotor, one or more support posts, and a pump base;

(b) a controller for controlling the speed of the pump or turning off the pump or sending a message to an operator or monitor;

(c) a vibration sensor on or in one or more of the plurality of pump structures, wherein the vibration sensor is configured to detect vibration and communicate the vibration to the controller; and (d) a second vibration sensor on or in one of the plurality of pump structures different from the pump structure that includes the vibration sensor, wherein the second vibration sensor is configured to detect vibration and communicate the vibration to the controller;

wherein the controller varies the speed of the pump, turns off the pump, and/or sends a message to a monitor or operator, based on the vibration detected by the vibration sensor and/or the vibration detected by the second vibration sensor.

2. The molten metal pump system of claim 1, wherein the controller is programmed with (a) a maximum vibration level for the vibration sensor and the controller is configured to turn off the molten metal pump if the maximum vibration level is exceeded, and (b) a second maximum vibration level for the second vibration sensor and the controller is configured to turn off the molten metal pump if the second maximum vibration level is exceeded.

3. The molten metal pump system of claim 1 that further includes a thermocouple positioned in one or more of: the pump base, one or more of the one or more support posts, the rotor, or the rotor shaft, wherein the thermocouple is configured to measure the temperature of molten metal in which the pump is positioned and communicate the temperature to the controller.

4. The molten metal pump system of claim 1, wherein the controller is remote to the pump.

5. The molten metal pump system of claim 1, wherein the controller is on the superstructure of the pump.

6. The molten metal pump system of claim 3, wherein the thermocouple is in an enclosed box that is configured to be positioned beneath the molten metal when the molten metal pump is positioned in a molten metal bath, so the thermocouple does not contact the molten metal.

7. The molten metal pump system of claim 1 that further includes a laser on the superstructure, wherein there is an insulating material between the superstructure and the laser.

8. The molten metal pump system of claim 1, wherein a second thermocouple is positioned in the vessel, is remote from the pump, and is configured to communicate with the controller.

9. The molten metal pump system of claim 8, wherein the communication from the thermocouple to the controller is wireless.

10. The molten metal pump system of claim 7, wherein the communication from the laser to the controller is wireless.

11. The molten metal pump system of claim 1, wherein the communication from the vibration sensor to the controller is wireless.

12. The molten metal pump system of claim 1, wherein the communication from the second vibration sensor to the controller is wireless.

13. The molten metal pump system of claim 1 that further comprises a display that shows a measured temperature of the molten metal, a measured depth of the molten metal, and speed of the molten metal pump.

14. The molten metal pump system of claim 1, wherein the controller comprises a memory that stores an operational history of the molten metal pump.

15. The molten metal pump system of claim 1, wherein the controller can be accessed from a remote location.

16. The molten metal pump system of claim 15, wherein the controller can be reprogrammed from the remote location.

17. The molten metal pump system of claim 1, wherein the vibration sensor is an accelerometer, and the second vibration sensor is an accelerometer.

18. The molten metal pump system of claim 1, wherein there is an insulating material between the superstructure and a molten metal bath when the molten metal pump is in a molten metal bath.

19. The molten metal pump system of claim 13, wherein the controller varies the speed of the pump, turns off the pump, and/or sends a message to a monitor or operator, based on (a) the temperature of the molten metal, (b) the depth of the molten metal, and/or (c) the vibration of the pump.

20. The molten metal pump system of claim 1, wherein the controller is further configured to receive one or more of the pump speed and pump load and wherein the controller varies the speed of the pump, turns off the pump, and/or sends a message to a monitor or operator, based on (a) the temperature of the molten metal, (b) the depth of the molten metal measured, (c) the speed of the pump, and/or (d) the pump load.

21. The molten metal pump system of claim 7 that further comprises a depth measuring device mounted and configured so as to measure the depth of molten metal in a second vessel, wherein the second depth device is in communication with the controller.

22. The molten metal pump system of claim 1 that further comprises a scale that measures the weight of molten metal in a structure and communicates the weight to the controller.

23. The molten metal pump system of claim 1, wherein the first vibration sensor is on or in the rotor shaft and the second vibration sensor is in the rotor.

* * * * *